(12) United States Patent
Zhang

(10) Patent No.: US 11,455,312 B1
(45) Date of Patent: Sep. 27, 2022

(54) DATA QUERY SYSTEM WITH IMPROVED RESPONSE TIME

(71) Applicant: SABRE GLBL INC., Southlake, TX (US)

(72) Inventor: Yanjun Zhang, Southlake, TX (US)

(73) Assignee: SABRE GLBL INC., Southlake, TX (US)

( * ) Notice: Subject to any disclaimer, the term of this patent is extended or adjusted under 35 U.S.C. 154(b) by 391 days.

(21) Appl. No.: 16/689,682

(22) Filed: Nov. 20, 2019

(51) Int. Cl.
*G06F 16/2457* (2019.01)
*G06F 16/215* (2019.01)
*G06Q 10/02* (2012.01)
*G06F 16/248* (2019.01)
*G06F 16/25* (2019.01)

(52) U.S. Cl.
CPC ...... *G06F 16/24578* (2019.01); *G06F 16/215* (2019.01); *G06F 16/248* (2019.01); *G06F 16/252* (2019.01); *G06Q 10/02* (2013.01)

(58) Field of Classification Search
None
See application file for complete search history.

(56) References Cited

U.S. PATENT DOCUMENTS

| | | | |
|---|---|---|---|
| 5,642,502 A | 6/1997 | Driscoll | |
| 6,154,765 A * | 11/2000 | Hart | G06F 9/44 709/201 |
| 6,947,920 B2 | 9/2005 | Alpha | |
| 7,739,277 B2 | 6/2010 | Meyerzon et al. | |
| 9,964,225 B2 * | 5/2018 | Zhang | B01D 29/114 |
| 10,515,085 B2 | 12/2019 | Jacob et al. | |
| 10,606,825 B1 | 3/2020 | Sosonkin et al. | |
| 11,086,890 B1 * | 8/2021 | Li | G06F 16/335 |
| 2008/0147578 A1 | 6/2008 | Leffingwell et al. | |
| 2013/0018820 A1 | 1/2013 | Landra et al. | |
| 2017/0024665 A1 * | 1/2017 | Cholewiak | G06Q 10/025 |
| 2017/0167623 A1 * | 6/2017 | Zhang | B01D 29/114 |
| 2018/0312437 A1 * | 11/2018 | Cao | C08G 18/8029 |
| 2019/0032153 A1 * | 1/2019 | Lu | C12Q 1/6855 |
| 2022/0147774 A1 | 5/2022 | Böderl-Ermel et al. | |

FOREIGN PATENT DOCUMENTS

| | | |
|---|---|---|
| CN | 107392571 A | 11/2017 |
| CN | 113763010 A | 12/2021 |
| WO | 2008086146 A2 | 7/2008 |

* cited by examiner

*Primary Examiner* — Kim T Nguyen
(74) *Attorney, Agent, or Firm* — Baker Botts, LLP

(57) ABSTRACT

A system reduces the time and resources needed to search a large dataset by preprocessing the dataset prior to receiving a query. Generally, the system evaluates and combines rules that govern the validity of the data. The system combines rules to determine conditions under which data objects in the dataset are invalid. After a query is issued, the system quickly eliminates data objects from the response by applying the conditions rather than the individual rules to the data objects.

20 Claims, 12 Drawing Sheets

_120_

Rule 1 (702A)

| S | M | T | W | T | F | S |
|---|---|---|---|---|---|---|
| ▨ |   |   |   |   |   | X |
| X |   |   | X |   | X |   |
| X |   | X |   |   |   |   |
| X |   |   |   |   | X | X |
| X |   |   | ▨ | ▨ | ▨ | ▨ |

Rule 2 (702B)

| S | M | T | W | T | F | S |
|---|---|---|---|---|---|---|
| ▨ |   |   |   |   |   |   |
|   |   |   |   |   |   |   |
|   |   |   | X | X | X | X |
|   | X | X | X | X | X | X |
|   |   |   | ▨ | ▨ | ▨ | ▨ |

Rule 3 (702C)

| S | M | T | W | T | F | S |
|---|---|---|---|---|---|---|
| ▨ |   |   |   |   | X | X |
|   | X | X |   |   |   |   |
|   |   | X | X |   |   |   |
|   |   |   |   |   | X | X |
|   | X | X | ▨ | ▨ | ▨ | ▨ |

Rule 4 (702D)

| S | M | T | W | T | F | S |
|---|---|---|---|---|---|---|
| ▨ |   |   |   |   |   | X |
| X |   |   |   |   |   | X |
| X |   |   |   |   |   | X |
| X |   |   |   |   |   | X |
| X |   |   | ▨ | ▨ | ▨ | ▨ |

Rule 5 (702E)

| S | M | T | W | T | F | S |
|---|---|---|---|---|---|---|
| ▨ | 5 | 4 | 3 | 2 | 1 | 0 |
| 6 | 5 | 4 | 3 | 2 | 1 | 0 |
| 6 | 5 | 4 | 3 | 2 | 1 | 0 |
| 6 | 5 | 4 | 3 | 2 | 1 | 0 |
| 6 | 5 | 4 | ▨ | ▨ | ▨ | ▨ |

Rule 6 (702F)

| S | M | T | W | T | F | S |
|---|---|---|---|---|---|---|
| ▨ | 0 | 0 | 0 | 0 | 0 | 2 |
| 1 | 0 | 0 | 0 | 0 | 0 | 2 |
| 1 | 0 | 0 | 0 | 0 | 0 | 2 |
| 1 | 0 | 0 | 0 | 0 | 0 | 2 |
| 1 | 0 | 0 | ▨ | ▨ | ▨ | ▨ |

*FIG. 7A*

DATA QUERY SYSTEM WITH IMPROVED RESPONSE TIME

TECHNICAL FIELD

This disclosure relates to data query systems.

BACKGROUND

An increasing amount of digital data is generated daily. Data analytics or "big data" attempt to leverage this data by organizing and processing particular sets of data in a useful manner for further analysis and display. Search engines provide a mechanism for users and other systems to search for and obtain specific data (e.g., stored in data objects or files) for inspection and further use. Search engines may receive a search query from a user or another system that includes search criteria used by the search engine to filter and evaluate potential candidates to return in response to the search query. Searching may come at large processing and memory costs, which may scale exponentially with the size of the datasets. Additionally, as the size of a dataset increases, the time required to search that dataset also increases, thus slowing down the speed at which search results are returned to a user. If the search is too slow, it may even return outdated data.

SUMMARY

As described above, hosting and using a search engine may be computationally and resource intensive for searching large datasets. And, although the processing power of computer systems continues to increase, it pales in comparison to the increase in the amount of data available for processing and searching. As a result, the time to complete searches on large datasets may be excessive, which may limit their usability. For example, some applications may require or desire search results within a predetermined period of time. To improve the user experience, it may be important that these applications have response times that are imperceptible or substantially imperceptible to a user.

To speed up search results, datasets may be organized or preconfigured to allow for more efficient searching by the provided criteria. For example, datasets may be ranked or sorted according to higher-level criteria based on a priori knowledge about the datasets. In particular, a database hosting files that can be searched may be organized according to a super-type such as a file type that limits the available search space for the lower-level search criteria, such as word searching within the body of text in a document. However, such techniques may be less applicable for datasets that are updated regularly. For example, some datasets may be updated on the order of an hour or less. Although some of these updates may be minimal (e.g., changing or adding a small proportion of the dataset), these updates may result in search queries that are out-of-date, which for some applications, may be costly. For example, out-of-date searches may lead to wasting resources retrieving invalid data, which may result in further data access and processing to rerun the search query. Accordingly, preconfiguring or pre-searching certain datasets may not provide useful shortcuts for reducing the search space or for speeding up the search time.

Additionally, there may be many data objects that fit the criteria provided during the search query. As a result, the returned search results may be overwhelming and difficult to use. While further targeted searches may be performed to narrow the results, there may be limits on how the search can be narrowed without losing valid data. Thus, there may be a need to predict the top results or rank the results that allow for a system or user to evaluate the search results efficiently.

As described above, conventional systems and methods face several technical problems that limit the analysis and processing of large datasets. For example, conventional systems do not adequately address the problems associated with searching large and quickly-changing datasets. In particular, too much time may pass between the search query and the results such that the reason motivating the search is no longer relevant. As another example, conventional systems may require re-running searches and the consumption of larger amounts of processing resources for quickly-changing datasets. In particular, if the datasets on which the searches are run are out-of-date, the search results may return invalid or out-of-date results. In response, the querying system or user may attempt to re-run the search, thereby wasting the resources expended to run the first search. Further, merely adding more processing power to increase the speed of searching may not adequately address these issues due to the large (and ever growing) size of the searched datasets.

As described in detail herein, one or more embodiments provided in this disclosure include one or more technical advantages or solutions to existing technical problems. For example, certain embodiments simplify or summarize datasets including data objects such that searching one of the datasets is more efficient and less resource intensive. For example, in certain embodiments, each data object may be bound to a plurality of rules (or a rule set) that govern when the data object is applicable (e.g., in response to a search), and prior to receiving a search, a set of conditions (or rule summaries) for each data object is determined in which the data object is invalid based on a combination of some of the bound rules. As a result, multiple rules may be summarized by creating an easy, binary yes or no check during the actual search query. Because this may occur before a query is provided (and before receiving the actual search criteria), the rule summary for each object may be reused for multiple search queries until the data object or the rules bound to it are changed. This may be especially useful when there are a large number of queries between updates and when accuracy of the search results is important. As another example, certain embodiments allow for the reuse of the set of conditions for different data objects if the data objects are bound to the same rules (or at least the rules that are summarized and reflected in the set of conditions). In this manner, the set of conditions need not be explicitly calculated for each and every data object. Certain embodiments may have none, some, or all of the above-recited advantages. Other advantages may be readily apparent to one having skill in the art in light of the present disclosure.

According to one embodiment, a method includes obtaining, from a data hosting server, first, second, third, and fourth data objects stored on the data hosting server. The method also includes binding to the first data object a first plurality of rules that govern the applicability of the first data object, binding to the second data object a second plurality of rules that govern the applicability of the second data object, binding to the third data object a third plurality of rules that govern the applicability of the third data object, and binding to the fourth data object a fourth plurality of rules that govern the applicability of the fourth data object. The method further includes determining a first set of conditions under which the first data object is invalid. The first set of conditions is a logical union of at least (1) a set of conditions under which the first data object is invalid according to a first rule of the first plurality of rules and (2) a set of conditions under which the first data object is invalid according to a second rule of the first plurality of rules. The method also includes determining a second set of conditions under which the second data object is invalid. The second set of conditions is a logical union of at least (1) a set of conditions under which the second data object is invalid according to a first rule of the second plurality of rules and (2) a set of conditions under which the second data object is invalid according to a second rule of the second plurality of rules. The method further includes determining a third set of conditions under which the third data object is invalid. The third set of conditions is a logical union of at least (1) a set of conditions under which the third data object is invalid according to a first rule of the third plurality of rules and (2) a set of conditions under which the third data object is invalid according to a second rule of the third plurality of rules. The method further includes determining a fourth set of conditions under which the fourth data object is invalid. The fourth set of conditions is a logical union of at least (1) a set of conditions under which the fourth data object is invalid according to a first rule of the fourth plurality of rules and (2) a set of conditions under which the fourth data object is invalid according to a second rule of the fourth plurality of rules. The method also includes, after determining the first, second, third, and fourth sets of conditions receiving, from a user, a query comprising search criterion and in response to receiving the query, determining that the first data object, the third data object, and the fourth data object are eligible for the query by determining that the search criteria does not satisfy the first, third, and fourth set of conditions, invalidating the second data object by determining that the search criteria satisfies at least one condition of the second set of conditions, after determining that the first data object is eligible, determining that the first data object is valid by applying each rule from the first plurality of rules that was not used to determine the first set of conditions, after determining that the fourth data object is eligible, determining that the fourth data object is valid by applying each rule from the fourth plurality of rules that was not used to determine the fourth set of conditions, after determining that the third data object is eligible, invalidating the third data object in response to determining that a condition under which the third data object is invalid according to a rule from the third plurality of rules that was not used to determine the third set of conditions is satisfied, in response to determining that the first data object and the fourth data object are valid, determining, that the first data object has a higher ranking than the fourth data object, and in response to determining that the first data object has a higher ranking, presenting, on a user terminal, the first data object in response to the query.

According to yet another embodiment, a method includes obtaining first, second, third, and fourth fares for a flight between a first location and a second location. The method also includes binding to the first fare a first plurality of rules that govern the applicability of the first fare, binding to the second fare a second plurality of rules that govern the applicability of the second fare, binding to the third fare a third plurality of rules that govern the applicability of the third fare, and binding to the fourth fare a fourth plurality of rules that govern the applicability of the fourth fare. The method further includes determining a first set of dates on which the first fare is invalid. The first set of dates is a logical union of at least (1) a set of dates on which the first fare is invalid according to a first rule of the first plurality of rules and (2) a set of dates on which the first fare is invalid according to a second rule of the first plurality of rules. The method also includes determining a second set of dates on which the second fare is invalid. The second set of dates is a logical union of at least (1) a set of dates on which the second fare is invalid according to a first rule of the second plurality of rules and (2) a set of dates on which the second fare is invalid according to a second rule of the second plurality of rules. The method further includes determining a third set of dates on which the third fare is invalid. The third set of dates is a logical union of at least (1) a set of dates on which the third fare is invalid according to a first rule of the third plurality of rules and (2) a set of dates on which the third fare is invalid according to a second rule of the third plurality of rules. The method also includes determining a fourth set of dates on which the fourth fare is invalid. The fourth set of dates is a logical union of at least (1) a set of dates on which the fourth fare is invalid according to a first rule of the fourth plurality of rules and (2) a set of dates on which the fourth fare is invalid according to a second rule of the fourth plurality of rules. The method further includes, after determining the first, second, third, and fourth sets of dates, receiving, from a user, a search for flights between the first location and the second location, the search indicating a departure date and in response to receiving the search, determining that the first fare, the third fare, and the fourth fare are eligible for the search by determining that the departure date is outside the first, third, and fourth set of dates, invalidating the second fare by determining that the departure date is within the second set of dates, after determining that the first fare is eligible, determining that the first fare is valid by applying each rule from the first plurality of rules that was not used to determine the first set of dates, after determining that the fourth fare is eligible, determining that the fourth fare is valid by applying each rule from the fourth plurality of rules that was not used to determine the fourth set of dates, after determining that the third fare is eligible, invalidating the third fare in response to determining that departure date falls within a set of dates on which the third fare is invalid according to a rule from the third plurality of rules that was not used to determine the third set of dates, in response to determining that the first fare and the fourth fare are valid for the search, determining that the first fare is lower than the fourth fare, and in response to determining that the first fare is lower than the fourth fare, presenting the first fare in response to the search.

BRIEF DESCRIPTION OF THE DRAWINGS

For a more complete understanding of the disclosed embodiments and their features and advantages, reference is now made to the following description, taken in conjunction with the accompanying drawings, in which:

FIGS. 7A-7F illustrate an example operation of the search space organizer and a query server, in accordance with certain embodiments.

DETAILED DESCRIPTION

Figure 1:
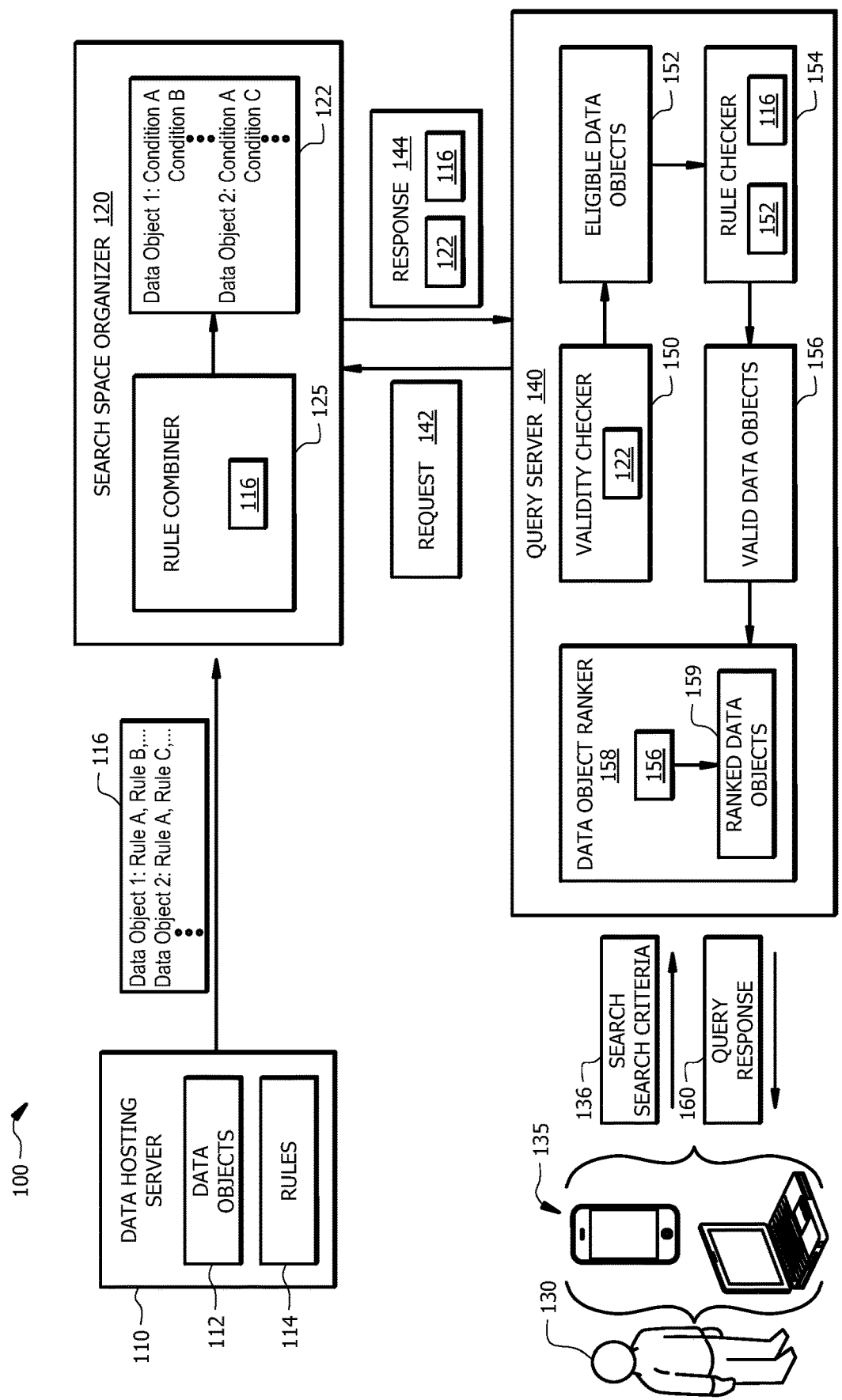
FIG. 1 illustrates an example system for responding to queries with one or more data objects according to search criteria, in accordance with certain embodiments.

Embodiments of the present disclosure and its advantages are best understood by referring to FIGS. 1 through 6 of the drawings, like numerals being used for like and corresponding parts of the various drawings. Although certain embodiments may be described in reference to particular illustrated examples, the disclosure herein is not limited to the particular illustrated embodiments and/or configurations and includes any and all variants of the illustrated embodiments and any and all systems, methods, or apparatuses consistent with the teachings of this disclosure, as understood by a person having ordinary skill in the art. These figures are not necessarily drawn to scale. Rather, the size of certain components in the figures may be embellished or exaggerated for clarity.

As described above, conventional systems and methods for querying datasets do not adequately address problems associated with searching large datasets requiring fast responses and for datasets that are updated frequently. A common type of large dataset is one in which data objects are governed by rules that apply based on certain criteria (e.g., dates). In the case of date-based rules, the rules serve to limit the data objects that are responsive to a query depending on date(s) specified in the query. For example, the rules may eliminate certain data objects as unresponsive to a query that specifies a particular date range.

One such system may include a flight search system that responds to queries from a user or travel agent system with available fares according to search criteria included in the query, such as the destination and origin, the departure and return dates, etc. Between two specific cities, there may be dozens of flights from one or more airlines or operators, with each flight having a dozen or more different fares that could apply for that flight. For example, in a scenario where a single airline itself serves 350 different cities, there could be more than 120,000 origin and destination pairs (O&Ds). For that single airline, there could also be multiple flights in a single day that serve a particular O&D. Moreover, each flight may be assigned multiple fares based on various rules. Some common rules include Eligibility, Day/Time, Seasonality, Flight Application, Advanced Reservations/Ticketing, Minimum Stay, Maximum Stay, Stopovers, Transfers, Permitted Combinations, Blackout Dates, Surcharges, Accompanied Travel, Travel Restrictions, Sales Restrictions, Penalties, Higher Intermediate Point/Mileage, Ticket Endorsements, Children Discounts, Tour Conductor Discounts, Agency Discounts, All Other Discounts, Miscellaneous Provisions, Fare By Rule, Groups, Tours, Visit Another Country, Deposits, Voluntary Changes, Voluntary Refunds, Negotiated Fare Restrictions, Application and Other Conditions.

A fare searching system may be responsible for responding to queries across all available destinations and for a wide swath of dates, sometimes exceeding a range of a year or more. Accordingly, the processing and other computing resources used for each search is multiplied thousands or millions of times over each day. The underlying data (e.g., fares, flights, availability, etc.) are also updated frequently. As a result, search queries that take too long to process may return outdated data.

Attempts to address these issues have not been adequate. For example, although there are methods in which a prior search is "cached" and reused for subsequent searches matching the prior search, such techniques can return outdated results. In particular, if the underlying dataset changes regularly (e.g., the set of available fares for a flight might change hourly), then the returned results may no longer be valid based on the search criteria. Furthermore, the returned results may not include all valid results (e.g., when new fares are opened and available for booking). Moreover, it is impractical to cache every possible search. Thus, the benefits of caching may be limited to the most frequently issued searches. Accordingly, conventional techniques are not sufficient to address this challenging problem.

Additionally, techniques to pre-process or categorize data prior to receiving search queries may not be able to provide sufficient time and resource savings. For example, rapidly changing datasets may require systems to reorganize the data more often and eat into any time and resource savings on the back end. As another example, some sets of data may not be easily categorized, thereby limiting the amount of potential savings by pre-processing the datasets.

Contemplated herein are solutions addressing one or more of the technical problems identified above. In particular, according to certain embodiments, improved methods for handling datasets for search systems are described using the example of a fare search system for flights. The improved methods may leverage particular properties of rules applied to the searched data objects (e.g., fares) to consolidate at least some of the rules into a computationally-light invalidating mechanism used when a search query is actually received. Certain embodiments also describe systems that carry out one or more of the improved methods and which may interface with other systems to carry out processes that are ancillary to the received search. Although the following disclosure describes the above-described problems and solutions thereto in reference to systems and methods for searching and displaying fares for airline flights, this disclosure also applies equally to other types of data objects associated with one or more validating rules and searching large sets of data based on criteria supplied by another system or use.

Although the subject matter described herein may be implemented in any appropriate type of search system using any suitable components, the embodiments disclosed herein are described in relation to a particular configuration of a data search system, such as the example system 100 illustrated in FIG. 1. For simplicity, FIG. 1 illustrates a system 100 that responds to search queries with one or more previously-stored data objects matching the search criteria in the search query. As illustrated in this example, system 100 includes a data hosting server 110, a search space organizing tool (SSO tool) 120, and a query server 140. System 100 interacts with a user 130 or user device 135 that initiates a search by sending a query 136 for data or other data structures matching the provided search criteria. In response, system 100 returns a query response 160, which may indicate or contain one or more data objects 112 matching the search criteria of query 136.

Device 135 includes any appropriate device for communicating with components of system 100. As an example and not by way of limitation, device 135 may be a computer, a laptop, a wireless or cellular telephone, an electronic notebook, a personal digital assistant, a tablet, or any other device capable of receiving, processing, storing, and/or communicating information with other components of system 100. Device 135 may also include a user interface, such as a display, a microphone, keypad, or other appropriate terminal equipment. In some embodiments, an application executed by device 135 may perform the functions described herein.

Data hosting server 110 is any suitable database or server that stores one or more data objects 112. In certain embodiments, data objects 112 may be one or more airline fares associated with a particular airline or flight and with an origin-destination (O&D) pair. Further, data hosting server 110 may also store other information related to data objects 112. For example, data hosting server 110 may also store one or more rules 114 which may be applied to data objects 112 to govern whether the data objects 112 are applicable to a query based on one or more search criteria. For example, in the flight fare context, a rule may indicate when a fare is available (e.g., what days of the week can the fare be used, how far in advance the fare must be booked, how long must the trip be, etc.). A single fare may be governed by one or more rules, and often half-a-dozen or more rules may be applied to each potential fare for a single flight.

In certain embodiments, sets of rules 114 govern individual data objects 112. Each data object 112 is bound to a set of rules 114 (or a rule set) prior to a search. This may include determining which rules 114 apply to a respective data object 112 and creating an association between the data object 112 and the applicable rules 114. In certain embodiments, data objects 112 bound with their respective rules 114 may be referred to as a dataset 116. Using the flight fares example, data hosting server 110 or another system, may bind to each of the fares a plurality of rules 114 that govern the applicability of the fares.

Prior to using data objects 112 and associated rules 114 in a search (e.g., responding to a search query), dataset 116 may be manipulated to reduce the amount of processing it takes to determine whether respective data objects 112 are valid based on the search criteria from query 136. For example, dataset 116 may be processed by SSO tool 120 before dataset 116 is made available to query server 140. The processing by SSO tool 120 may reduce the amount of processing by query server 140 required to determine whether data objects 112 are valid based on the search criteria. As a result, search results may be acquired more quickly and with less processing and computer resources consumed by system 100.

Dataset 116 may be structured in any suitable manner to read and process the data objects and bound rules 114. In certain embodiments, dataset 116 includes all of data objects 112 and their bound rules 114. In certain embodiments, dataset 116 includes only a subset of data objects 112 and their bound rules 114. As a particular example, dataset 116 may represent the fares and bound rules 114 for flights between a first location and a second location. In this example, SSO tool 120 may summarize dataset 116 for each data object 112. In some embodiments, there may be many datasets 116, each one corresponding to a different destination-origin pair or a different airline. For explanatory purposes, dataset 116 used below may refer to a set of fares associated with their bound fare rules for a single destination-origin pair. As will be apparent form the description below, the process of summarizing and processing dataset 116 may be applied to larger, more inclusive datasets or a series of datasets. In certain embodiments, SSO tool 120 utilizes techniques of parallel processing to handle multiple datasets concurrently.

SSO tool 120 may be implemented in any suitable combination of hardware and/or software configured to process one or more datasets 116. In certain embodiments, SSO tool 120 implements a rule combiner 125 configured to that converts dataset 116 into a more easily validated form. For example, rule combiner 125 may create a check data structure 122 that combines one or more of the bound rules 114 for a data object 112 into a set of conditions that are easily processed during the search process to determine if a respective data object 112 is valid based on one or more of the search criteria. Query 136 may indicate that one of the conditions should be applied based on a particular search criterion. Instead of applying the respective rules 114 that have been incorporated into check data structure 122, query server 140 may only have to determine if the applied condition invalidates the data object 112. In this manner, data objects 112 having an invalid condition based on search query 136 may be invalidated and eliminated from further consideration. This may result in a significant reduction of the number of data objects 112 and bound rules that need to be checked and validated to provide query response 160. For example, if three rules are combined into a condition (or rule summary), query server 140 may evaluate fares against that one condition rather than evaluating fares against each of the three rules separately. In this manner, the search process may be sped up and the processing and computing overhead reduced.

As described above, a check data structure 122 may be created for dataset 116 and the underlying data objects 112. The respective conditions of check data structure 122 may incorporate one or more of rules 114. In some embodiments, check data structure 122 incorporates all of rules 114. In this scenario, the validation process is greatly reduced. In a more common scenario, as in certain embodiments, check data structure 122 incorporates a subset of rules 114 into the respective conditions. For example, some of rules 114 may be easily incorporated into a binary invalid/not invalid indication without requiring the search criteria of query 136. As a particular example, some fares may be bound with rules 114 that indicate that the fare is invalid except for departures on weekdays or for departures in a particular season.

These rules may be easily combined into a series of conditions (e.g., each condition representing a different calendar day), that indicate if the rules 114 invalidate the fare or not. In certain embodiments, multiples of such rules 114 are combined into a single condition (e.g., a single calendar day). For example, two rules 114 that can invalidate a fare based on whether the departure date falls on a particular date may be combined into a single condition for that date associated with the fare. As another example, rules 114 that depend on more than a single criterion (e.g., more than a departure date) may also be combined into a condition. For example, a fare rule 114 may include a minimum trip length or that the trip must include a Monday for the fare to not be invalid. In such cases, the condition may not be a binary invalid/not invalid indication but may provide a simpler checking mechanism for checking if the fare is invalid than if both rules 114 had to be checked separately. As a particular example, the condition may be a particular number (e.g., a number of days required between the departure date and the origin date) for that particular condition. This may be represented as a number that may be used for comparison after query 136 is received. Although certain examples of the types of rules 114 that may be combined by rule combiner 125 of SSO tool 120 have been provided, any suitable rules 114 that may be combined may also be combined and included as part of check data structure 122.

In addition, SSO tool 120 may evaluate rule hierarchy as part of the process of creating check data structure 122. Evaluating and utilizing rule hierarchy prior to receiving a search query may reduce response time.

Once created, check data structure 122 and/or dataset 116 may be sent to query server 140 for use in responding to query 136. In certain embodiments, this may be provided to query server 140 in response to a request 142 from query server 140. For example, query server 140 may periodically send request 142 to obtain the latest versions of dataset 116 and/or check data structure 122, which SSO tool 120 sends in response 144. In certain embodiments, SSO tool 120 provides check data structure 122 and/or dataset 116 without receiving a request or according to a predetermined schedule. In other embodiments, query server 140 obtains one or more of check data structure 122 and dataset 116 from another component of system 100. For example, query server 140 may obtain data objects 112 and rules 114 from data hosting server 110, compiled together in dataset 116 or separately. As another example, check data structure 122 is provided to an intermediary storage system, database, or server, such as data hosting server 110, which provides it to query server 140, automatically, periodically, or by request. In this manner, query server 140 may obtain not only data objects 112 and rules 114 bound thereto, but also the pre-processed dataset 116 in the form of check data structure 122, which may drastically reduce the amount of resources consumed in responding to a search.

Query server 140 may conduct one or more searches on dataset 116 using check data structure 122. In certain embodiments, user 130 may send query 136 via a user device 135 to query server 140. For example, user 130 may search for flights using her computer through a web browser or application by designating one or more search criteria that are included in query 136. Query 136 may be communicated to query server 140 in any suitable manner, such as by any electrical and/or digital communications system, including the Internet. While not explicitly illustrated, there may be one or more intervening and intermediary systems or components of system 100 between user device 135 and query server 140 that facilitate communication between the two (e.g., to transmit query 136 and query response 160).

In certain embodiments, query server 140 may implement one or more subsystems that are configured to carry out one or more discrete or related tasks involved in the search process. In certain embodiments, query server 140 includes validity checker 150, rule checker 154, and data object ranker 158. As a general overview, validity checker 150 may use check data structure 122 to invalidate one or more of data objects 112 based on applicable conditions indicated by the search criteria to obtain the set of eligible data objects 152 that are still valid. Rule checker 154 may process dataset 116 by applying the remaining rules (e.g., rules that were not completely combined to form the conditions of check data structure 122) for the remaining data objects 112 indicated in eligible data objects 152. This results in an indication of one or more valid data objects 156. The search may end here and the valid data objects 156 or indications thereof may be provided in query response 160. In certain embodiments, query server 140 further processes valid data objects 156 in data object ranker 158, which ranks the data objects 156 according to one or more ranking criterion. The top result or a ranked list of the results may be provided in query response 160, which may be displayed or indicated for display on user device 135 of user 130.

There is a distinction between an eligible data object 152 and a valid data object 152. Data objects 152 are considered eligible for responding to a query when conditions of check data structure 122 do not invalidate the data objects 152. Validity checker 152 then applies the rules that were not completely combined to form the conditions of check data structure 122 to the eligible data objects 152 to determine which of the eligible data objects 152 are valid. The valid data objects 152 are then ranked and considered for presentation to a user who issued the query. Using certain methods disclosed herein, system 100 may quickly invalidate certain fares so that the slower, real-time validation process is performed on fewer remaining eligible fares, thus reducing response time.

According to certain embodiments, validity checker 150 is implemented within query server 140. Validity checker 150 may receive check data structure 122 and evaluate the conditions corresponding to each data object 112 to determine if the data object 112 is invalid and should be discarded or disregarded downstream during the query process. In particular, in some embodiments, query 136 includes one or more search criteria which may be obtained by validity checker 150. Validity checker 150 may determine that one or more of the data objects 112 are invalid based on one or more of the conditions in check data structure 122. The data objects 112 that were not invalidated at validity checker 150 may be designated as eligible data objects 152. This process will be described in more detail using the examples of FIGS. 2 and 4-6.

The designated eligible data objects 152 may be further processed to determine whether one or more of the data objects 152 is valid for responding to query 136. For example, rule checker 154 of query server 140 may apply any remaining rules 114 indicated in dataset 116 for each of eligible data objects 152. Only some of the bound rules 114 to a data object may be completely combined to form the conditions associated with the data object 112. In the airline fare context, some fare rules 114 cannot be combined into a single binary invalid/not invalid designation based solely on a departure date or into a single numerical representation that can be compared against the trip length indicated in query 136. In this manner, these remaining rules 114 may be indicated in check data structure 122 or in a modified version of dataset 116 so that rule checker 154 may determine that those rules 114 need further processing to determine which, if any, eligible data objects 152 are valid. In some embodiments, the remaining rules 114 are indicated by omission from an indication of which rules were fully combined into the one or more conditions for the data object 112. Accordingly, rule checker 154 may validate one or more data objects 112 based on the search criteria of query 136 and indicate which data objects 112, if any, meet the search criteria and are valid data objects 156.

As described above, the data objects 112 in valid data objects 156 are provided to user device 135 for indication and/or display via some application or browser. In certain embodiments, query server 140 further processes valid data objects 156. For example, in certain embodiments, data object ranker 158 is implemented in query server 140 to rank valid data objects 156. In some embodiments, data object ranker 158 ranks valid data objects 156 according to a score or value associated with each of the data objects in valid data objects 156. This score or value represents how closely the respective data object matches the search criteria of query 136. This ranking reflects an ordering of the valid data objects 156 according to an inherent or pre-assigned value. In the example of airline fares, the fares may be ranked according to price, which may be designated to each fare a priori. The price may be determined by applying one or more rules, such as a surcharge rule, to determine the full price after determining which data objects are valid or after determining which data objects are eligible.

As a result, a ranked list of ranked data objects 159 may be determined by query server 140. In certain embodiments, user 130 is provided ranked data objects 159 in query response 160, which may be displayed or otherwise indicated at user device 135. In other embodiments, user 130 is provided only a subset of ranked data objects 159 in query response 160. For example, query server 140 may limit the number of valid data objects 156 to return in response to query 136 (e.g., the top X number of valid data objects 156). In some embodiments, only the top-ranked data object of ranked data objects 159 is provided in query response 160 and/or indicated for display to user 130 on user device 135.

As a result, query server 140 may provide one or more data objects 112 in query response 160 that match or are otherwise correlated with the search criteria in query 136. Additionally, due to the combination of rules 114 by SSO tool 120, validity checker 150 of query server 140 may quickly and more efficiently eliminate data objects 112 that are invalid based on easy-to-check conditions (e.g., multiple single-date rules that can be combined into conditions in check data structure 122 that would otherwise have to be checked individually at rule checker 154). This may provide significant processing and computing savings, particularly for large datasets in which many rules may apply and where a larger proportion of data objects 112 can be invalidated by the compiled rule sets represented in check data structure 122.

Figure 2:
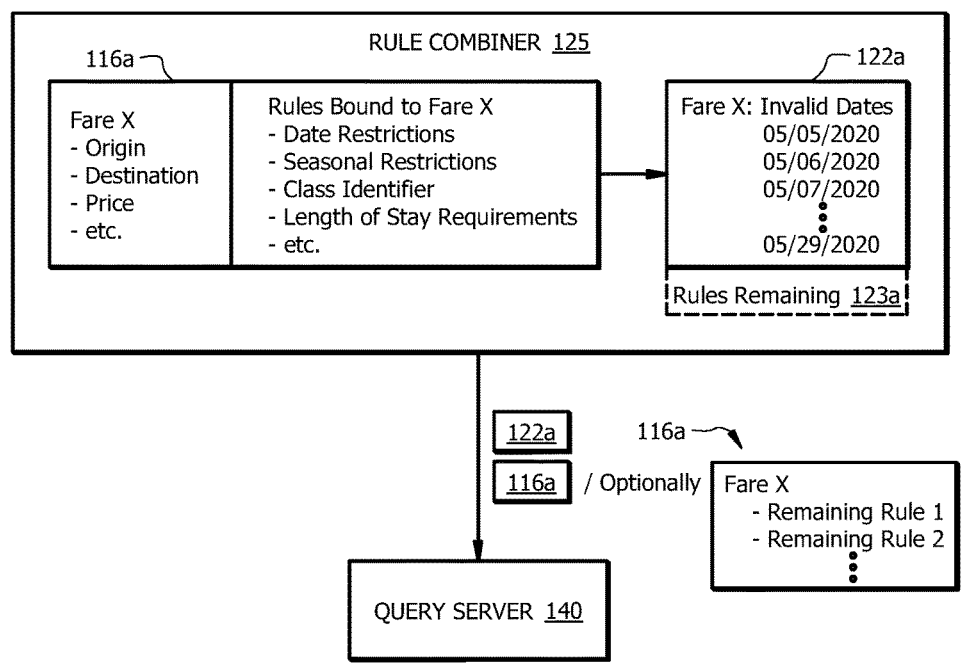
FIG. 2 illustrates a particular example configuration of a rule combiner of a search space organizing tool, according to certain embodiments.

FIG. 2 illustrates a particular example configuration of rule combiner 125 of SSO tool 120, according to certain embodiments. As described above, rule combiner 125 creates a check data structure 122 that combines one or more rules 114 for a data object 112 into a set of conditions.

In the illustrated example, rule combiner 125 receives dataset 116 that includes data entry 116a corresponding to a single airline Fare X with the rules 114 bound to Fare X. Fare X may be defined by one or more inherent characteristics, such as the origin and destination pair to which Fare X is applicable. Additionally, Fare X may be associated with a price value, which may represent a base price and/or a complete price. A plurality of rules 114 may be bound to Fare X, such as date restrictions (e.g., departure date or necessary day of week inclusion restrictions), seasonal restrictions, advance reservation restrictions, length of stay restrictions, etc.

Rule combiner 125 may create check entry 122a for check data structure 122 that corresponds to Fare X and its bound rules 114. In this example, the conditions in check entry 122a are a set of dates for which Fare X is invalid based on one or more of the bound rules 114. Rule combiner 125 determines, for each date in a date range, whether Fare X would be invalid for the respective date based on two or more bound rules 114. In this manner, the list of invalid dates provides an easy binary check mechanism for query server 140 to use to invalidate Fare X in the case that the departure date indicated in query 136 matches one of the dates in the list of invalid dates.

Although the example of a list of invalid dates is used for the conditions that may be created and associated with Fare X, any suitable set of conditions may be generated based on the plurality of rules bound to Fare X. For example, the set of conditions for Fare X may be a list of numbers associated with each date in a date range that represents the minimum trip length value required for departure on that respective date. In this manner, validity checker 150 of query server 140 may only have to compare the trip length indicated in query 136 (e.g., based on a difference between the departure date and a return date) to the value corresponding to the departure date associated with Fare X to determine whether to invalidate Fare X (e.g., if the value is larger than the searched-for trip length). Accordingly, any number of different rule combinations may be considered by rule combiner 125. The particular combination of rules may depend on the type of rules 114 used for dataset 116 and/or the type of the underlying data objects 112.

In certain embodiments, check data entry 122a may be obtained by determining that a different check data entry (e.g., corresponding to a different fare) has already been created and that different fare had the same rules bound to that fare that were incorporated into the different check data entry. Instead of repeating the process to create check data entry 122a, rule combiner 125 may obtain the different check data entry and use it as check data entry 122a. This may occur in a variety of different circumstances. For example, it may occur when another fare is bound with all of the fare rules 114 bound to Fare X.

However, it may also occur when only a subset of the fare rules 114 are shared between the other fare and Fare X. In particular, if the rules that are different between two fares are not incorporated into determining the invalid dates, then the two fares may share the same check data entry 122a. In this manner, rule combiner 125 may instead reuse the previously calculated check data entry, thereby saving processing resources and reducing the time to form check data structure 122. This may be particularly advantageous when there is significant overlap in the bound rules 114 for the fares and the overlapping rules are the type of rules that are combined into check data structure 122.

In certain embodiments, data check entry 122a may be further associated with optional remaining rules 123a that are remaining after the creation of data check entry 122a for Fare X. For example, remaining rules 123a may indicate which, if any, rules that are bound to Fare X that were not fully encapsulated into data check entry 122a and require further application to fully validate Fare X. For example, remaining rules 123a may be indicated to query server 140 and used by rule checker 154 to determine which rules 114 bound to Fare X still need to be applied to determine valid data objects 156 from eligible data objects 152. In a particular embodiment, data check entry 122a may correspond to date-related rules and remaining rules 123a may correspond to flight-related rules.

In certain embodiments, the remaining rules 123a may be alternatively indicated in dataset 116 passed down to query server 140. For example, instead of the data entry 116 being passed to query server 140 for use in validating Fare X, a modified data entry 116a* may be provided that indicates Fare X and the remaining rules that need to be applied. In this manner, some indication is provided to query server 140 to ensure that only the remaining rules 123 are applied after using check data entry 122a to invalidate or find eligible Fare X.

As described above, SSO tool 120 may provide query server 140 with check data structure 122 and/or dataset 116 directly or indirectly. For example, in some embodiments, SSO tool 120 provides check data structure 122 without an intermediary system used for distribution or storage. In another example, SSO tool 120 provides check data structure 122 to a temporary cache location or locations from which check data structure 122 is distributed to query server 140. This may be advantageous in a distributed system in which query server 140 includes hardware and software distributed across multiple systems. Accordingly, although particular configurations of the components of system 100 are expressly described herein, any suitable combination and configuration of elements may be applied to carry out one or more of the described functions and features.

In the illustrated example, only a single data entry 116*a* for a single fare, Fare X, was discussed, but the described embodiments may be applicable to dataset 116 that includes many data entries like data entry 116*a*. Similarly, each data entry may give rise to a check data entry 122, such as check data entry 122*a* (and optionally remaining rules 123*a*). Accordingly, rule combiner 125 may process entire datasets 116 of fares and their bound rules 114 for entire markets and for entire airlines and destination-origin pairs. As a result, the number of rules 114 that must be checked individually, e.g., by rule checker 154, may be significantly reduced, thereby reducing the processing and computing burden on query server 140, which may result in faster search results in response to query 136.

In certain embodiments, multiple date-related conditions may be established based on different flight details. For example, conditions may be categorized by flight directionality, by outbound/inbound/trip originality, or by travel segment indicator (TSI). Separate conditions may also be created for different flight attributes, such as different qualifying rule requirements.

Figure 3:
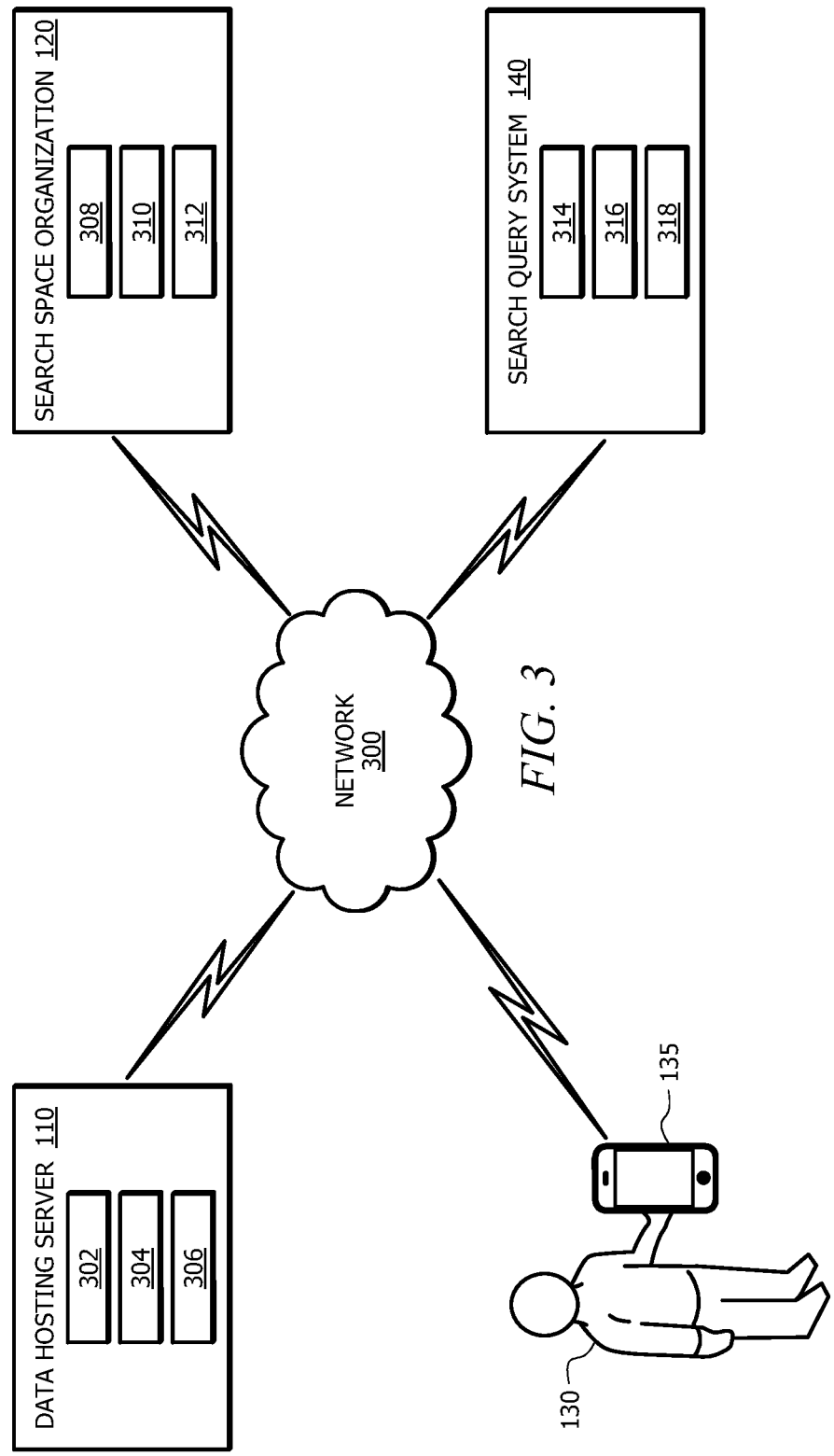
FIG. 3 illustrates an example configuration of the system for responding to queries, in accordance with certain embodiments.

FIG. 3 illustrates an example configuration of system 100, in accordance with certain embodiments. In the illustrated configuration, system 100 includes data hosting server 110, SSO tool 120 and query system 140, which may be communicatively coupled together by network 300. Network 300 may be any suitable communications network or combination of networks in which data and signals may be communicated between the components of system 100. For example, network 300 may facilitate one or more of the functions of system 100 by communicating one or more of data objects 112, rules 114, dataset 116, check data structure 122, query 136, query response 160, or any other data between the components of system 100. In certain embodiments, system 100 may include further components, such as additional servers, databases, relays, gateways, etc., that may facilitate communication and handling information for carrying out one or more of the functions described herein.

According to certain embodiments, each of data hosting server 110, SSO tool 120, and query system 140 is implemented using any suitable combination of hardware and/or software to carry out one or more of the functions of the respective component described herein. For example, in some embodiments, data hosting server 110 includes one or more interfaces 302, memory 304, and processor 306. As another example, in some embodiments, SSO tool 120 includes one or more interfaces 308, memory 310, and processor 312. Further, in some embodiments, query system 140 includes one or more interfaces 314, memory 316, and processor 318. In certain embodiments, one or more of the components of system 100 is co-located and/or share one or more pieces of hardware and/or software. In certain embodiments, each of the illustrated components of system 100 are implemented on discrete hardware and/or software. In certain embodiments, one or more of the components of system 100 are implemented in a cloud or distributed computing platform.

In particular, data hosting server 110 using one or more of interfaces 302, memory 304, and processor 306, may host data objects 112, rules 114, and any other information that may be related to or used by SSO tool 120 and/or query system 140. For example, data hosting server 110 may store individual fares and fare rules and the association between them (e.g., which fare rules are bound to each fare). In some embodiments, data hosting server 110 uses one or more interfaces 302 to interact with SSO tool 120 and/or query system 140 to provide periodic updated datasets 116 or data objects 112 and rules 114 or respond to data requests. Additionally, data hosting server 110 may interact with other systems, such as airline fare systems to obtain new fares and periodically check for updates.

Likewise, SSO tool 120, using one or more interfaces 308, memory 310, and processor 312, may create check data structure 122. For example, memory 310 may store dataset 116 and in combination with processor 312, rule combiner 125 may create the combined rule sets represented in check data structure 122 by determining a set of invalidating conditions that combine one or more rules 114 into a simplified checking mechanism. Additionally, one or more interfaces 308 may be used to receive dataset 116 and/or communicate with query server 140 to provide check data structure 122 with which, query server 140 may efficiently respond to search queries, such as query 136.

Similarly, query server 140, may determine one or more valid data objects 156 that may be included in query response 160 using a combination of one or more interfaces 314, memory 316, and processor 318. For example, in certain embodiments, one or more interfaces 3314, memory 316, and/or processor 318 may be used to implement one or more of validity checker 150, rule checker 154, and data object ranker 158. In certain embodiments, a combination of one or more interfaces 314, memory 316, and processor 318 carries out one or more of the above-described functions of query server 140, such as determining eligible objects 152 based on check data structure 122 and validating eligible data objects 152 to determine the set of valid data objects 156, which may be presented to user 130 (e.g., by displaying one or more highest ranked data objects on user device 135).

In some embodiments, data hosting server 110, SSO tool 120, and/or query server 140 include multiple sets of one or more of the illustrated components for different communications, data storage and/or processing technologies. Each of these different technologies may be integrated into the same or different chips or set of chips as other components within data hosting server 110, SSO tool 120, and/or query server 140, respectively.

One or more interfaces 302, 308, 314 may include one or more antennas or antenna arrays, configured to send and/or receive wireless signals. In certain alternative embodiments, one or more interfaces 302, 308, 314 may not include an antenna, but may include an interface for interfacing with an external antenna connectable to data hosting server 110, SSO tool 120, and/or query server 140 through one of one or more interfaces 302, 308, 314. One or more interfaces 302, 308, 314 and/or one or more of processor 306, 312, 318 may be configured to perform any receiving or transmitting operations described herein as being performed by data hosting server 110, SSO tool 120, and/or query server 140. Any information, data and/or signals may be received from a network node and/or another wireless node.

In certain embodiments, one or more interfaces 302, 308, 314, may include any suitable electronic, digital, or optical interface for facilitating communication between components of system 100. In some embodiments, one or more interfaces 302, 308, 314 may include circuitry configured to convert or encode data as part of communicating data to or from other components. Additionally, in certain embodiments, one or more interfaces 302, 308, 314 may also include one or more interfaces for communicating between different subcomponents of data hosting server 110, SSO tool 120, and/or query server 140.

Processor 306, 312, 318 may include be any electronic circuitry, including, but not limited to microprocessors, application specific integrated circuits (ASIC), application specific instruction set processor (ASIP), and/or state machines, that communicatively couples to memory 304, 310, 316 and controls the operation of data hosting server 110, SSO tool 120, and query server 140, respectively. Processor 306, 312, 318 may be 8-bit, 16-bit, 32-bit, 64-bit or of any other suitable architecture. Processor 306, 312, 318 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 306, 312, 318 may include other hardware and software that operates to control and process information.

In certain embodiments, processor 306, 312, 318 executes software stored on memory 304, 310, 316, to perform any of the functions described herein. For example, processor 306, 312, 318 may control the operation and administration of data hosting server 110, SSO tool 120, and query server 140, respectively, by processing information received from memory 304, 310, 316, or any external databases, or any other components in the system 100 or other network to which data hosting server 110, SSO tool 120, or query server 140 belongs. In certain embodiments, processor 306, 312, 318 carries out one or more functions of data hosting server 110, SSO tool 120, and query server 140, respectively, or any components thereof. Processor 306, 312, 318 may include a programmable logic device, a microcontroller, a microprocessor, any suitable processing device, or any suitable combination of the preceding. Processor 306, 312, 318 is not limited to a single processing device and may encompass multiple processing devices.

In certain embodiments, processor 306, 312, 318 includes one or more of wireless transceiver circuitry, wireless signal processing circuitry, and application processing circuitry. In other embodiments, the processor 306, 312, 318 includes different components and/or different combinations of components. In certain embodiments, processor 306, 312, 318 includes a system on a chip. In some embodiments, processor 306, 312, 318 or components thereof are on a single chip, separate chips, or a set of chips.

Memory 304, 310, 316 may store, either permanently or temporarily, data, operational software, or other information for processor 306, 312, 318. In certain embodiments, memory 304, 310, 316 may store one or more of data objects 112, rules 114, dataset 116, check data object 122, eligible data objects 152, valid data objects 156, ranked data objects 159, or any other information used in creating check data structure 122 and carrying out the search for valid data objects in response to query 136. Memory 304, 310, 316 may include any one or a combination of volatile or non-volatile local or remote devices suitable for storing information. For example, memory 304, 310, 316 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 304, 310, 316, a disk, a CD, or a flash drive.

In certain embodiments, memory 304, 310, 316 stores a computer program, software, an application including one or more of logic, rules, code, tables, etc. and/or other instructions capable of being executed by processor 306, 312, 318. In particular embodiments, the software includes an application executable by processor 306, 312, 318 to perform one or more of the functions described herein. In certain embodiments, memory 304, 310, 316 is implemented as a NoSQL database. In some embodiments, processor 306, 312, 318 and memory 304, 310, 316 are integrated.

In certain embodiments, some or all of the functionality described herein as being performed by data hosting server 110, SSO tool 120, and query server 140, respectively, is provided by processor 306, 312, 318 executing instructions stored on memory 304, 310, 316, which may be a computer-readable storage medium. In alternative embodiments, some or all of the functionality may be provided by processor 306, 312, 318 without executing instructions stored on a separate or discrete device readable storage medium, such as in a hard-wired manner. In any of those particular embodiments, whether executing instructions stored on a device readable storage medium or not, processor 306, 312, 318 can be configured to perform the described functionality.

Processor 306, 312, 318 may be configured to perform any determining, calculating, or similar operations (e.g., certain obtaining operations) described herein as being performed by data hosting server 110, SSO tool 120, and query server 140, respectively. These operations, as performed by processor 306, 312, 318, may include processing information obtained by processor 306, 312, 318 by, for example, converting the obtained information into other information, comparing the obtained information or converted information to information stored by data hosting server 110, SSO tool 120, and query server 140, respectively, and/or performing one or more operations based on the obtained information or converted information, and as a result of said processing making a determination.

Additionally, the terms "database," "databases," "server," and/or "services" or any other reference to a "database" or "server" may refer to any suitable combination of hardware and/or software, such as memory and control logic, for storing, accessing, retrieving, and communicating various types of information, for example, data objects such as airline fares and rules such as fare rules. Although the disclosure herein refers to data hosting server 110, SSO tool 120, and query server 140, system 100 may utilize any suitable server or database implemented thereon that may store information used for providing the above-referenced information used in providing check data structure 122 and query response 160.

Databases or servers contemplated for use in system 100, including data hosting server 110, SSO tool 120, and query server 140, may be implemented in any suitable manner. As an example, each of data hosting server 110, SSO tool 120, and query server 140 may be implemented as a single server or database, as multiple servers or databases, as a server or databases distributed over multiple locations, as one or more virtualized servers or databases (e.g., implemented on the cloud), or provided as a service. Additionally, databases or servers described herein may be implemented using hardware, software, or any suitable combination thereof. Furthermore, servers, databases, or systems described herein may share one or more hardware or software elements with other servers, databases, or systems, including servers, databases, or systems not owned or controlled by the same entity implementing portions of system 100. Accordingly, the terms "database," "databases," "server," and/or "services" as referenced herein, e.g., as used in reference to system 100, may refer to any suitable apparatus or implementation of software that may provide access to the information used by system 100.

Figure 4:
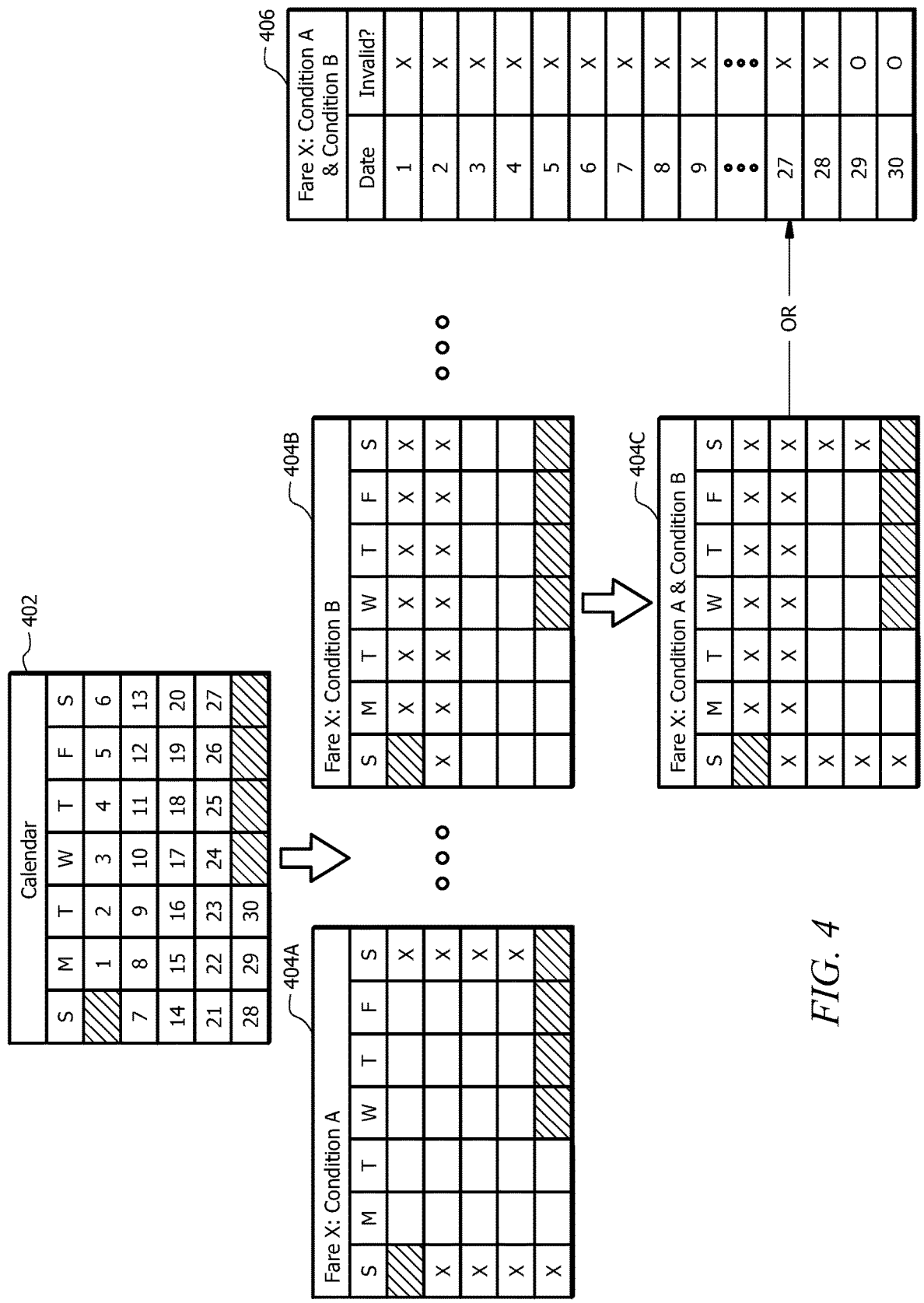
FIG. 4 illustrates a first example combination of one or more fare rules into a check data entry, in accordance with certain embodiments.

FIG. 4 illustrates a first example combination of one or more fare rules into a check data entry, such as check data entry 122a, in accordance with certain embodiments. In this illustrated example, two rules, Rule A and Rule B are bound to Fare X and both rules are single-day invalidating rules, meaning that to determine whether the rule invalidates Fare X, only a departure date (or some other date) needs to be checked. Accordingly, each of Rule A and Rule B may be represented over a range of days (e.g., one month as depicted in calendar 402) in a calendar form, as depicted in FIG. 4. For each day in the calendar 402, Rule A and Rule B may be considered, e.g., by rule combiner 125, and if the respective rule invalidates Fare X on that day, an indication (such as the illustrated "X") may be created for that date.

In this example, Rule A indicates that Fare X is not valid for departure dates on Saturday or Sunday. Accordingly, the Saturdays and Sundays on the calendar 404A for Rule A are marked with an X (or binary 0 or 1 depending on a preferred convention). Further, Rule B (as modeled in calendar 404B) indicates a different criteria in which the flight for the first two weeks of a month cannot be booked with Fare X. For example, these weeks may be a holiday or high-volume weeks, such as Spring Break. Instead of checking each of these rules separately, e.g., at rule checker 154 at query server 140, these rules may be combined for Fare X, e.g., by rule combiner 125 of SSO tool 120. These rules only rely on a departure date, and therefore, may be determined for a range of potential dates before any search query is provided.

Instead of requiring real-time individual rule checking for Rules A and B, the rules may be combined into a combined rule set, such as check data entry 122a. For example, in FIG. 4, Rule A and Rule B may be combined by taking the union of the invalid indications of the individual calendars 404A and 404B, resulting in a combined rule calendar 404C. The combined rule calendar 404C may indicate the invalid dates, which represent all of the invalid dates from Rule A and all of the invalid dates from Rule B in one data checking mechanism. Accordingly, query server 150 using validity checker 150 need only make one check: is the departure date indicated in query 136 in the set of invalid dates of the combined rule calendar 404C, instead of checking if the departure date is in the set of invalid dates for Rule A and if not, continue to check if it is in the invalid dates for Rule B. Thus, the combination of these rules may reduce the search space or number of checks to determine if Fare X is invalidated and may be discarded from further validation. In particular, if invalidated by the combined rule calendar 404C, then even if Fare X was associated with ten other rules, none of those would be checked since it was already invalidated, e.g., at validity checker 150 and not included in eligible data objects 152.

In certain embodiments, the combined invalid dates may be converted into a different format or stored differently than how stored as Rule A or Rule B bound to Fare X. For example, instead of a calendar format, the combined rule set may be stored as an array 406 arranged by date and for each date, an entry is either a first value or a second value if the combined rules invalidate or do not invalidate Fare X. In certain embodiments, the set of dates on which Fare X is invalid are represented in a bit map, wherein the bit map includes a bit value for each day in the range of dates considered. The bit value may be a first value if the respective day is if the rule invalidates Fare X on that date and a second value if not. This may be constructed for each rule, such as Rule A and Rule B, and combined into combined rule set through a OR process (or NAND depending on the convention). In this manner, the combined rules may be stored in suitable manner in which query server 140 may, through little processing, determine if any of Rule A or Rule B invalidates Fare X.

Figure 5A:
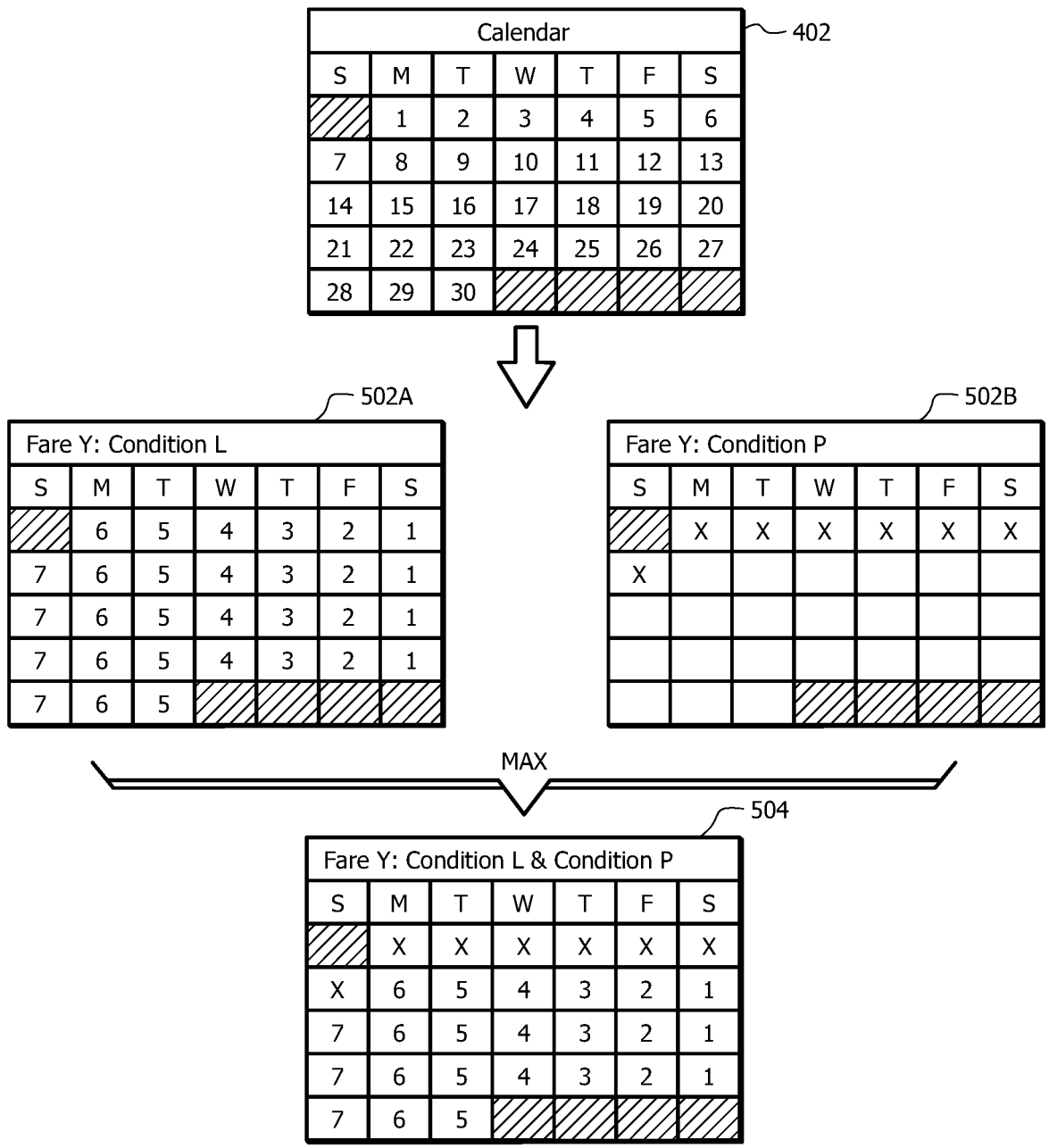
FIG. 5A illustrates a second example combination of one or more fare rules into a check data entry, in accordance with certain embodiments.

Although the example depicted in FIG. 4 includes only two rules, Rule A and Rule B, any number or similar-type rules may be combined. For example, if there are more than two rules for Fare X that are single-date rules, then those can be combined in the manner described above. Likewise, the example rule combination described below in reference to FIG. 5A is not limited to just two rules, but may include any combination of rules that can be encapsulated in the same manner, e.g., a minimum trip length value. Moreover, there may be multiple combined rule sets for each type of combinable rule. For example, the combined rule set in FIG. 4 may be used in combination with the combined rule set in FIG. 5A. In particular, check data structure 122 may have multiple sets of conditions corresponding to different types of rules that have been combined in the manner described herein. Further, validity checker 150 may apply each of the combined rule sets and exclude any fare from eligible data objects 152 that is invalidated by any of the combined rule sets.

FIG. 5A illustrates a second example combination of one or more fare rules into a check data entry 122, such as check data entry 122a, in accordance with certain embodiments. As with the example described above, multiple rules may be combined to create a combined rule set or checking mechanism that reduces the number of validations required to determine whether a fare is valid based on the search criteria of query 136. FIG. 5A illustrates an example of two rules, Rule L (as modeled in calendar 502A) and Rule P (as modeled in calendar 502B) that are bound to Fare Y.

Rule L may be interpreted as limiting the validity of Fare Y to trips that include a stay on Saturday night. This may be represented as a minimum trip length value (MTLV) that may be calculated based on the rule. In this particular example, Rule L will have a MTLV of 7 for Sunday because if the departure date is on a Sunday, then the trip length (different from the departure date and return date) must be at least 7 (i.e., at least extending to the following Sunday and thus include a Saturday night stay) for Fare Y to be valid. Likewise, the MTLV of Mondays would be 6, and so on as seen in calendar 502A. Rule P may be a different rule and, in this example, interpreted as requiring a departure date that is at least one week away from the booking date. Thus, if it is the first day of the month, then Fare Y would not be available for departure dates from the first through the seventh of the month. As seen in FIG. 5A, those dates are marked with an 'X,' indicating that Fare Y is unavailable on those dates.

The combination of Rules L and P may be different from the combination of Rules A and B described above in reference to FIG. 4. For example, due to the values assigned to the respective dates in the range of dates, a simple OR or NAND operation may not sufficiently capture the essence of the underlying rules. In this scenario, for each date in the range of dates, the MTLV of Rule L is adopted unless Rule P already invalidates the date. Thus, as seen in FIG. 5A, calendar 504 shows that Fare Y is unavailable from the first through the seventh of the month and that the MTLV of calendar 502A applies for the other dates.

The combined rule set may be used by a fare searching system, such as query server 140 in system 100. For example, at validity checker 150 of query server 140, the departure date and searched trip length value may be determined by query server 140 based on the search criteria of query 136 (e.g., based on user 130 entering a first date for her departure and a second date as her return date). If the departure date is on the first through the seventh of the month, then Fare Y is determined to be unavailable. If the departure date is after the seventh, then the trip length value may be compared against the MTLV of the combined rule for Fare Y corresponding to the departure date. For example, if the searched fares are for a three-day trip starting on a Friday, then the value three may be compared to the Friday MTLV of the combined rule. In this example, the trip length of three days exceeds the MTLV indicated in the combined rule. As a result, Fare Y may not be invalidated using the combined rules of Rules L and P at validity checker 150. If, however, the trip length was only two days and departure was on a Monday, then Fare Y would be invalidated based on the combined rule. In this manner, fare rules may be combined into a less-processing-intensive checking mechanism that may be used by a fare searching system, such as those described herein.

The above-described examples illustrate how, according to certain embodiments, rules may be compiled or combined before being used to respond to a search. This front-end processing can result in large processing savings on the backend (e.g., at query server 140). For example, if a fare on average is bound to five rules, the combination of three rules into a combined rule set may reduce processing required for invalidation or validation by over 50%. Notably, evaluation of the combined rule set would achieve the same result as evaluating the three rules individually. In other words, redundant evaluations that are performed by evaluating the three rules individually would be avoided, which may lead to significantly faster response times to queries. Because these techniques can apply to a variety of data objects 112 and bound rules 114, the savings may be multiplied on the order of the size of dataset 116. Moreover, the reusability of the check data structure 122 or individual entries thereof may limit the amount of processing in the frontend (e.g., by rule combiner 125) by limiting the circumstances in which a new combined rule set or check data entry 122a must be created. These factors, alone or in combination with other technical advantages of one or more embodiments described herein, may significantly reduce the processing or time required to provide an accurate response to a search query, especially for big and constantly updated datasets, such as available fares and their bound rules.

Other rules may be compiled into easy-to-use data structures, such as a calendar structure described above. For example, each fare for a flight within a market may have one or more surcharge rules that determine when and how much of a surcharge to apply to the base fare price based on a variety of factors, such as the date of the flight or flights. For single-day surcharge rules (e.g., based only on a departure date or return date), the surcharges may be compiled into a calendar or other data structure that associates a date with a particular surcharge for the fare if the flight is on that date. In some embodiments, different surcharge rules stack together, and therefore may be combined for a fare based on the date of the flight. Accordingly, the surcharge rules may be combined in a manner similar to the above, but in this example, the surcharge values are added instead of taking the maximum value for the combined rule value. In other embodiments, only the maximum surcharge is applied to the base fare price and thus, the combined rule does take the maximum value when combining the plurality of surcharge values for a date. In certain embodiments, surcharge rules may be combined to form different conditions depending upon application scope, such as whether surcharge is applied to a pricing unit (PU) or to a fare component (FC).

Surcharge rules may be applied as part of the ranking mechanism of query server 140. For example, data object ranker 158 may use the surcharge rules as part of the ranking process of fares. For example, if the fares are ranked according to price (low to high/high to low), then the full price for each fare may be compared to determine which fare is ranked the best or lowest. However, instead of obtaining the full price for each and every fare, even if they are invalid or if the base price of a fare exceeds the maximum possible full price of another fare, in certain embodiments, the surcharge rules may be used, in addition to the base price, to determine the ranking of the fares.

Figure 5B:
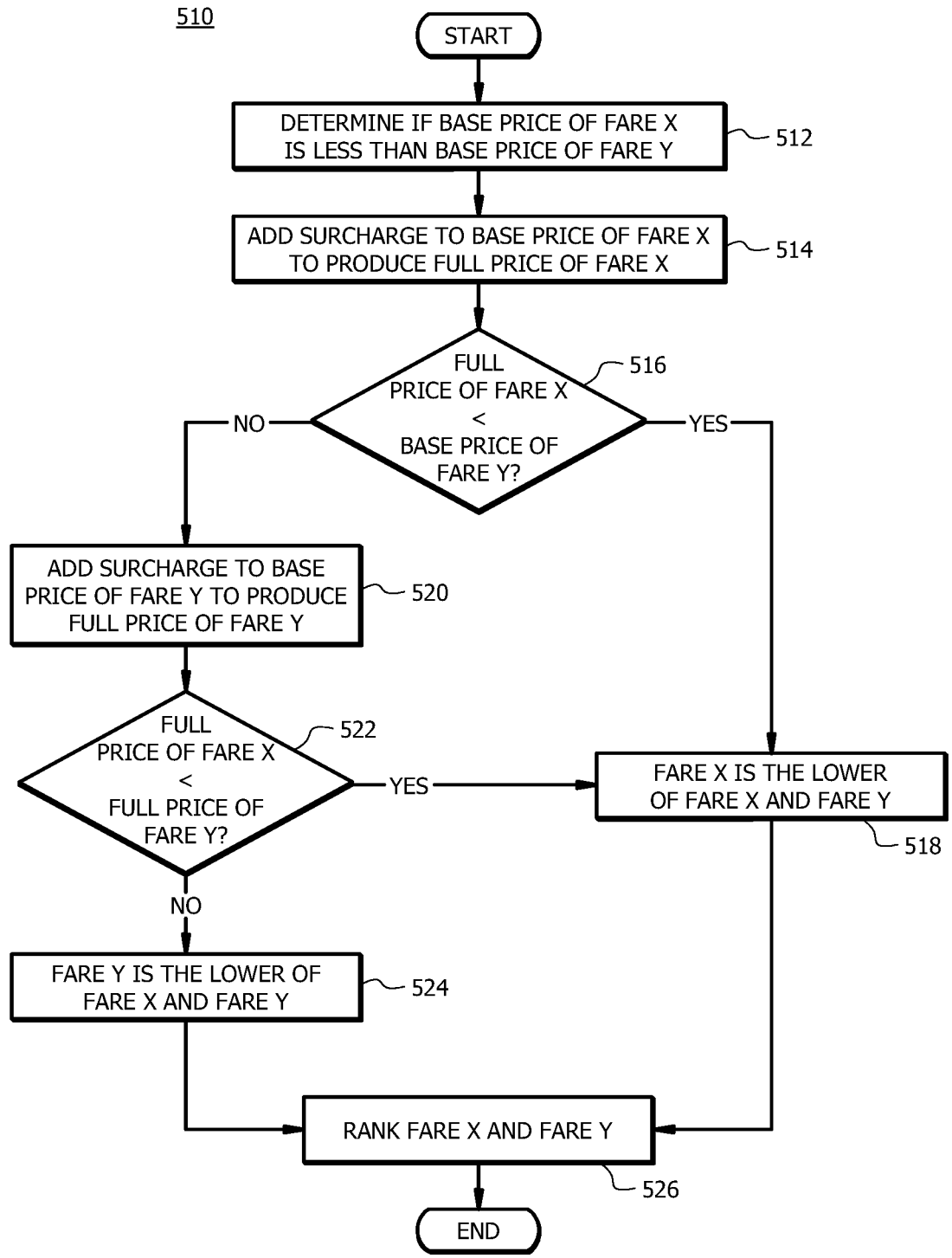
FIG. 5B is a flowchart diagram of an example method for ranking fares.

For example, if two fares are compared at data object ranker 158 of query server 140 to determine which of the fares has the lowest price, data object ranker 158 may carry out a process that efficiently uses the surcharge rules. Note that while the comparison of only two fares is described below, any number of fares may be included in the described process, which may further enhance the efficiency savings. FIG. 5B is a flowchart diagram of an example method 510 for ranking fares. In the example shown, all surcharges are assumed to be non-negative values. As a first step 512, the base prices of the two fares, e.g., Fare X and Fare Y, are compared and one is determined to be lower than the other. In this example, Fare X may have a lower base price than Fare Y.

In the next step 514, the full price of Fare X is determined. This may be accomplished by adding the surcharge value to the base price of Fare X for the indicated departure date and/or return dates. The surcharge value may be determined based on a compiled surcharge rule calendar that may reflect the contributions of one or more surcharge rules applicable and bound to Fare X. Once the full price of Fare X is determined, it may, in another step 516, be compared to the base price of Fare Y. If the base price of Fare Y exceeds the full price of Fare X, then Fare X may be determined to be the lower of the two fares in step 518. This is true because the surcharge value for Fare Y (and any fare) is a positive value and therefore, if the base price of Fare Y exceeds the full price of Fare X, then the full price of Fare Y must, necessarily, exceed the full price of Fare X.

If, however, the full price of Fare X exceeds the base price of Fare Y, additional steps may be taken. In particular, the surcharge value for Fare Y may be determined and added to the base price of Fare Y in step 520, e.g., in the manner described above for determining the full price of Fare X. Then the full prices of both Fare X and Fare Y may be compared and determined which of Fare X and Fare Y has the lowest price in step 522. If the full price of Fare X is lower than the full price of Fare Y, then Fare X is determined to be lower than Fare Y in step 518. If the full price of Fare Y is lower than the full price of Fare X, then Fare Y is determined to be lower than Fare X in step 524. This process may be repeated for all validated fares until a lowest-price (or highest-price) is determined or a ranking of the fares is completed. The fares are ranked in step 526. The ranking may determine which or how the validated fares are communicated via query response 160. In this manner, surcharge values may be used to rank the validated fares, which may allow query system 140 to promote the best or lowest-priced fare to user 130 in response to query 136.

Figure 6:
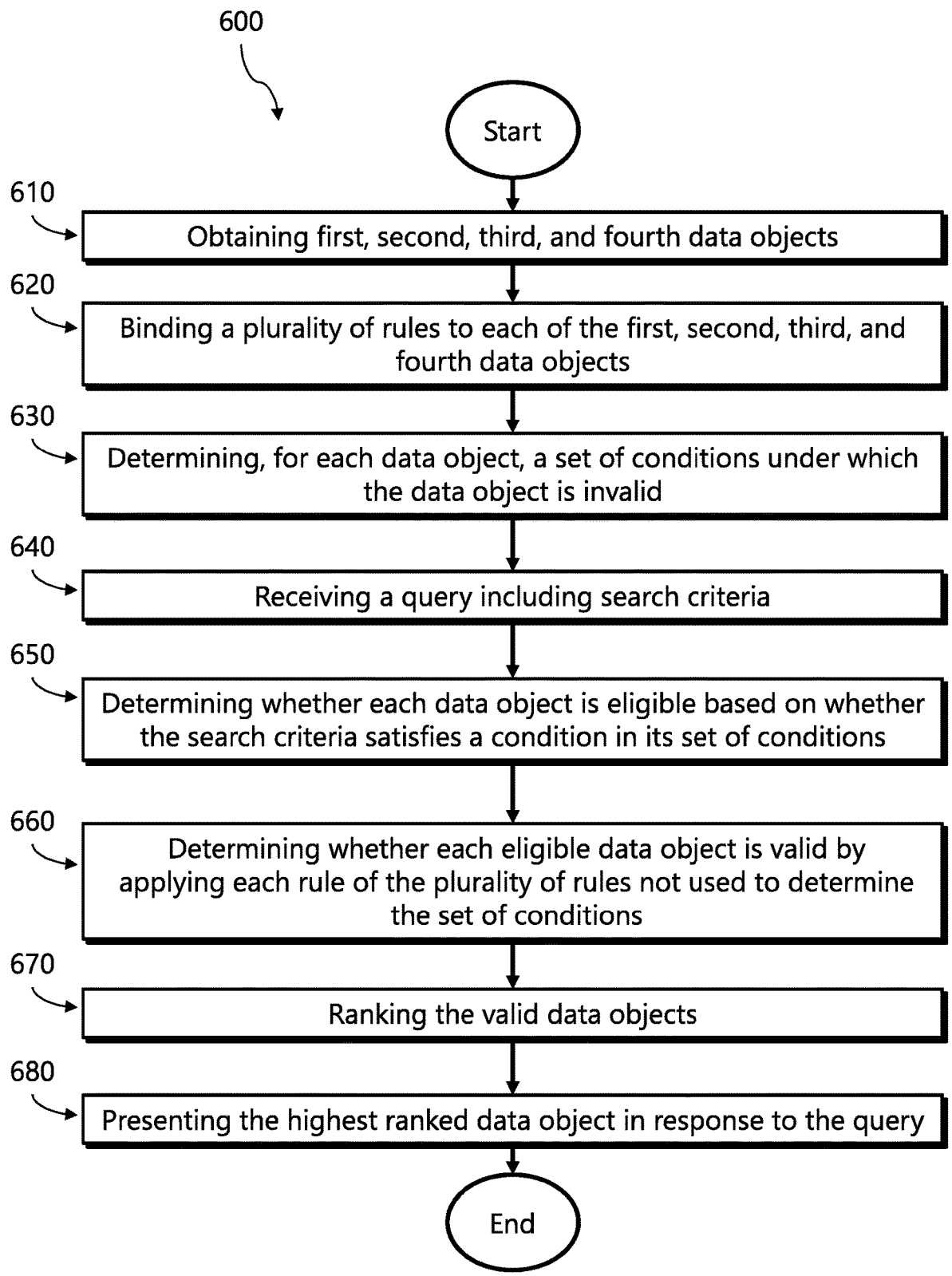
FIG. 6 is a flowchart diagram of an example method for using blended ancillary service preferences to provide flight options, in accordance with certain embodiments.

FIG. 6 illustrates an example method 600 for searching a set of data objects, in accordance with certain embodiments. Method 600 may begin at step 610, in which first, second third, and fourth data objects are obtained. For example, SSO tool 120 may obtain first, second, third, and fourth data objects in dataset 116 or separately as objects within data objects 112. In some embodiments, SSO tool 120 obtains the data objects form data hosting server 110, as described above. In particular embodiments, the data objects are first, second, third, and fourth fares for flights between a first location and a second location.

At step 620, a plurality of rules are bound to the corresponding data object for each of the first, second, third, and fourth data objects. For example, the corresponding rules of rules 114 may be bound to their respective data objects 112. In a particular example, a first plurality of rules governing the applicability of the first data object are bound to the first data object. This may be repeated for a second plurality of rules bound to the second data object, a third plurality of rules bound to the third data object, and a further plurality of rules bound to the fourth data object. In some embodiments, the data objects are different fares and the rules include a plurality of fare rules. The fare rules indicate in what circumstances (e.g., departure date, trip length, seat class, etc.) the fare is valid. In certain embodiments, step 620 may be a series of steps in which each plurality of rules is bound to each respective one of first, second, third, and fourth data objects.

At step 630, for each data object, a set of conditions under which the data object is invalid is determined. For example, a first set of conditions under which the first data object is invalid may be determined, a second set of conditions under which the second data object is invalid may be determined, a third set of conditions under which the third data object is invalid may be determined, and a fourth set of conditions under which the fourth data object is invalid may be determined. Each set of conditions may be a logical union of at least (1) a set of conditions under which the data object is invalid according to a first rule and (2) a set of conditions under which the data object is invalid according to a second rule. In certain embodiments, one or more of the sets of conditions is the logical union of more than two sets of conditions under which the data object is invalid according to more than two different rules of the plurality of rules bound to that data object.

In certain embodiments, the set of conditions for a data object is a set of invalid dates for a fare. For example, the set of conditions may be a set of dates on which the fare is invalid, which may be the logical union of at least two sets of dates on which the fare is invalid according to at least two different fare rules bound to the fare. The process of determining the set of conditions may be split into four sub-steps, one sub-step for each of the first, second, third, and fourth data objects and their corresponding first, second, third, and fourth plurality of rules bound to those data objects. In certain embodiments, the determination of the sets of conditions may be performed by a system or apparatus such as system 100 and particularly rule combiner 125 of SSO tool 120 as described above.

At step 640, a query including search criteria may be received. For example, query 136 may be received at query server 140 from user 130 via user device 135. The query may include search criteria that is used by a search engine or system to determine whether potentially relevant data objects are relevant or responsive to the query. In the illustrated embodiment, the query is received after the rules are bound to the data objects and the invalidating conditions are determined.

In particular, at step 650, each data object may be determined to be eligible or not eligible based on whether the search criteria satisfies a condition in its set of conditions. For example, if a search criterion satisfies on of the conditions of the set of conditions for a data object, that data object may be invalidated and not eligible for inclusion in the response for the query. Further, that data object may be excluded from further processing during the search process, thereby preventing unnecessary processing of data objects that would eventually be invalidated based on the one or more rules incorporated into the set of conditions.

In a particular example, the first data object, the third data object, and the fourth data object are determined to be eligible for the query by determining that the search criteria does not satisfy the first, third, and fourth set of conditions. In some embodiments, this correlates to the first, third, and fourth fares being eligible because the departure date indicated in a flight search is not included in the set of invalid dates for none of the first, third, and fourth fares. Further, in the particular example, the second data object may be invalidated by determining that the search criteria satisfies at least one condition of the second set of conditions. For example, a second fare may be invalidated because the departure date is in the set of invalid dates for the second fare.

At step 660, whether each eligible data object is valid is determined by applying each rule of the plurality of rules not used to determine the set of conditions. In a particular example, after determining that the first data object is eligible, the first data object is determined to be valid by applying each rule from the first plurality of rules that was not used to determine the first set of conditions. Likewise, after determining that the fourth data object is eligible, the fourth data object is determined to be valid by applying each rule from the fourth plurality of rules that was not used to determine the fourth set of conditions. However, in this example, after determining that the third data object is eligible, the third data object is invalidated in response to determining that a condition under which the third data object is invalid according to a rule from the third plurality of rules that was not used to determine the third set of dates is satisfied.

In the airline fare context, this may correspond to the first and fourth fares being valid by applying all of the remaining fare rules that were not completely encapsulated into the set of invalid dates based on at least the first and second rules of the plurality of rules for each of the first and fourth fares. However, the third fare was found to not be valid because of the application of one such rule that was not incorporated completely into the set of invalid dates. For example, a minimum trip length may not have been met based on the flight search criteria or a seat class rule may invalidate the fare if intended only for lower seat classes than the class indicated in the search for flights. Thus, in this example, the first and fourth fares are determined valid and potential candidates for response to the search.

At step 670, the valid data objects are ranked. For example, data objects may be ranked by data object ranker 158 of query system 140, as described herein. This may be based on any predetermined criteria or characteristic of the data objects. In some embodiments, the ranking may be carried out by applying one or more other rules (e.g., not related to validating or invalidating a data object) that corresponds to how the data objects should be ranked. In certain embodiments, the ranking of data objects may be a composite ranking across multiple dimensions of ranking criteria.

In a particular example, in response to determining that the first data object and the fourth data object are valid, the first data object may be determined to have a higher ranking than the fourth data object. In the airline fare context, this may correspond to determining the first fare has a lower price than the fourth fare. This may be determined by comparing the full prices of each of the first fare and the fourth fare and determining which fare is the lowest. In certain embodiments, the ranking includes applying one or more surcharge rules applicable to the first fare and the fourth fare, respectively. For example, an efficient process, as described above, of first comparing the base prices and the full price of one fare against the base price of the higher-priced fare may be used to rank or determine the lowest-price fare. In this manner, the data objects may be ranked or a best-ranked data object may be identified.

At step 680, the highest ranked data object may be presented in response to the query. For example, in response to determining that the first data object has a higher ranking, the first data object may be presented on a user terminal in response to the query. For example, query response 160 may carry the highest-ranked data object and may be displayed on user device 135 for user's evaluation. In some embodiments, more than a single data object is presented in response to the query. For example, a ranked list of all or a subset of the valid data objects may be included in the response. In a particular example, the lowest-priced fare is displayed to a user conducting a search for flights, but in some embodiments, additional higher-priced fares may be displayed below the lowest-priced option. As a result of method 600, one or more data objects may be presented in response to a search query using one or more of the improved techniques described herein. Notably, by evaluating conditions rather than individual rules, redundant evaluations that would have occurred by evaluating the rules individually are avoid. Avoiding these redundant evaluations may result in significantly faster response times to search queries.

Method 600 may include more, fewer, or other steps. For example, in certain embodiments, method 600 includes further steps to aid in booking one of the fares. In particular, method 600 may further include receiving a request to book the first fare and communicating with a booking system to cause the booking of the first fare for a flight between the first location and the second location. This communication may cause the booking system to book the flight corresponding to the first fare and the options and price associated with the first fare. In this manner, the search system, such as system 100, may be integrated within a larger system configured to facilitate the further use of the search results.

Additionally, steps may be performed in parallel or in any suitable order. While discussed as system 100 (or components thereof) performing certain steps, any suitable component of system 100, such as data hosting server 110, SSO tool 120, or query server 140, for example, may perform one or more steps of the methods. Additionally, method 600 may include any suitable step to carry out any of the described functions of system 100. Further, any of steps of method 600 may computerized and/or carried out using hardware, such as processor 115 of data hosting server 110, processor 128 of SSO tool 120, processor 148 of query server 140, or any other suitable system implementing one or more components of system 100, such as any hardware or software implementing data hosting server 110, SSO tool 120, and/or query server 140.

FIGS. 7A-7F illustrate an example operation of a search space organizer 120 and a query server 140. Generally, search space organizer 120 combines rules for data objects 112 to generate conditions prior to receiving or processing a search query 136. After a query 136 is received, query server 140 evaluates these conditions against criteria in the query 136 to determine which data objects 112 are eligible. Query server 140 evaluates rules that were not combined into conditions against the eligible data objects 112 to determine which eligible data objects 112 are valid. Query server 140 then ranks the valid data objects 112 and responds to the query 136 with the highest ranking data object 112.

FIG. 7A illustrates example rules in search space organizer 120. Each rule is modeled using a calendar 702. As seen in FIG. 7A, Rule 1 (modeled by calendar 702A), Rule 2 (modeled by calendar 702B), Rule 3 (modeled by calendar 702C), and Rule 4 (modeled by calendar 702D) invalidate particular dates of the month. Rule 5 (modeled by calendar 702E) and Rule 6 (modeled by calendar 702F) set minimum criterion values depending on the date of the month.

Figure 7B:
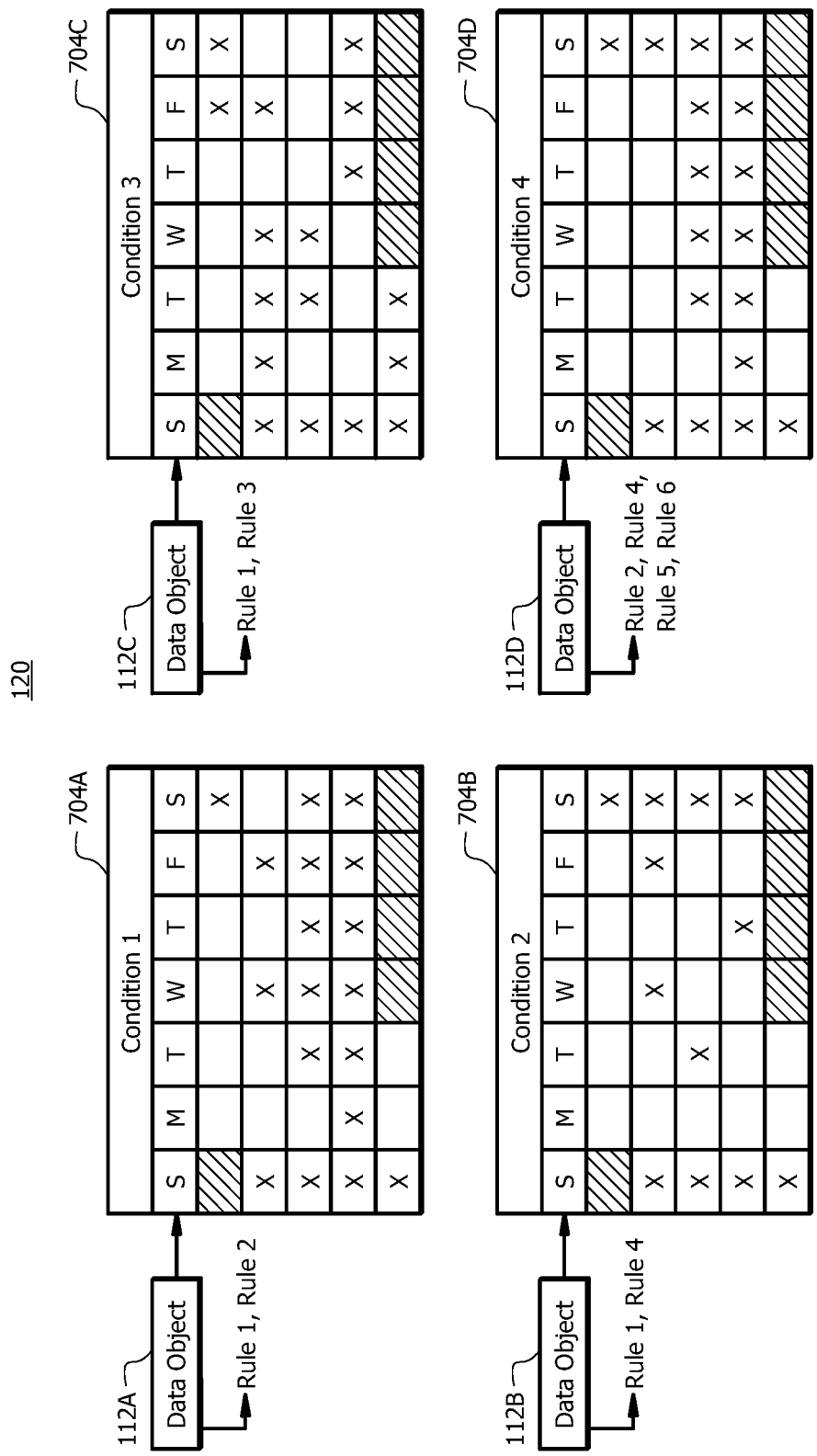
Figure 7C:
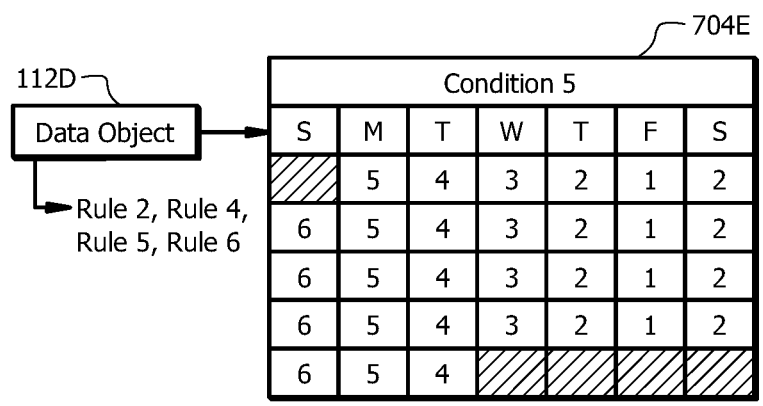

The rules in FIG. 7A are bound to particular data objects 112. As seen in FIG. 7B, Rules 1 and 2 are bound to data object 112A. Rules 1 and 4 are bound to data object 112B. Rules 1 and 3 are bound to data object 112C. Rules 2, 4, 5, and 6 are bound to data object 112D. Search space organizer 120 combines these bound rules to form conditions (as modeled by calendars 704). Each condition represents the logical union of the rules combined to form the condition. Condition 1 for data object 112A is modeled by calendar 704A, which is the logical union of calendars 702A and 702B. Condition 2 for data object 112B is modeled by calendar 704B, which is the logical union of calendars 702A and 702D. Condition 3 for data object 112C is modeled by calendar 704C, which is the logical union of calendars 702A and 702C. Condition 4 for data object 112D is modeled by calendar 704D, which is the logical union of calendars 702B and 702D. As seen in FIG. 7C, Condition 5 for data object 112D is modeled by calendar 704E, which includes the maximum values for each date from calendars 702E and 702F.

Figure 7D:
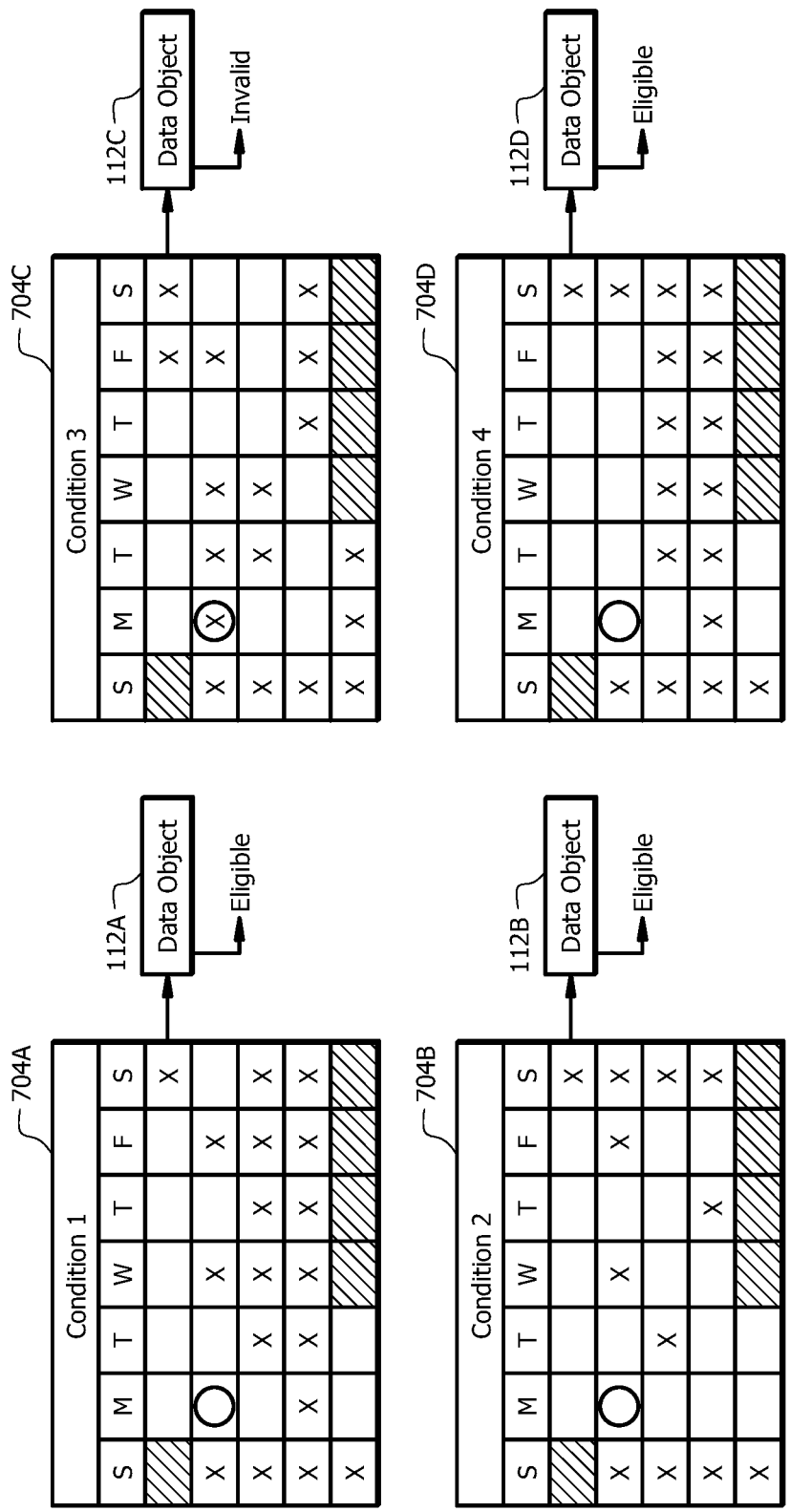
Figure 7E:
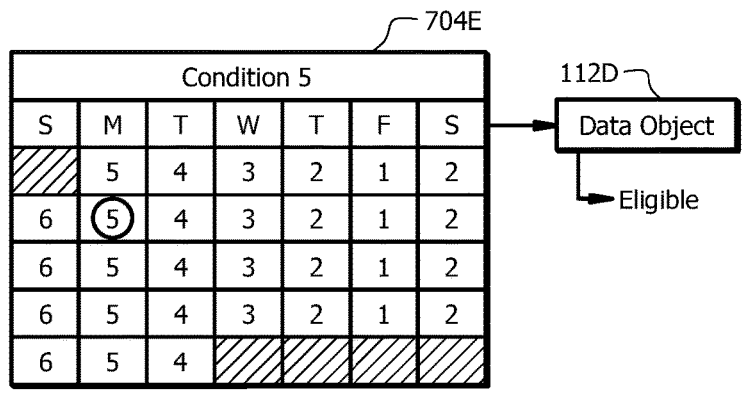

These conditions are evaluated against search criteria after a search query 136 is received. In FIG. 7D, query server 140 receives a search query 136. Query 136 indicates the dates Monday the 8th and Monday the 15th. The first date is evaluated against Conditions 1-4. Calendars 704A, 704B, and 704D show that Monday the 8th is not invalid. In response, query server 140 determines that data objects 112A, 121B, and 112D are eligible. Calendar 704C shows that Monday the 8th is invalid. In response, query server 140 determines that data object 112C is invalid. As seen in FIG. 7E, calendar 704E shows that Monday the 8th includes a value of five. Because there are seven days between Monday the 8th and Monday the 15th (the dates specified in the query 136), data object 112D remains eligible according to calendar 704E.

Figure 7F:
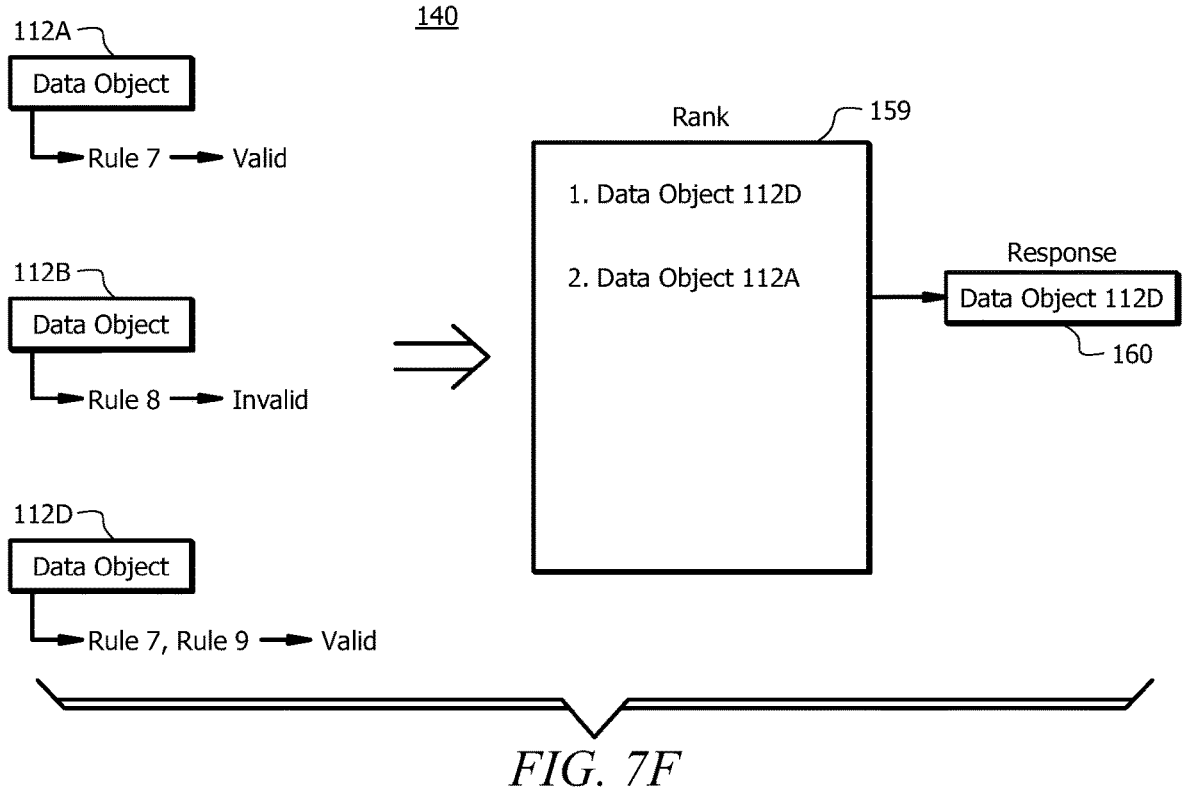

The eligible data objects 112 are evaluated against any remaining rules bound to those data objects 112 to determine whether those data objects are valid. As seen in FIG. 7F, data object 112A is bound to Rule 7, data object 112B is bound to Rule 8, and data object 112D is bound to Rules 7 and 9. Rules 7, 8, and 9 may not have been combined into conditions by search space organizer 120. Query server 140 evaluates data objects 112A, 112B, and 112D against one or more of Rules 7, 8, and 9 to determine whether these data objects 112A, 112B, and 112D are valid. In the example of FIG. 7F, data objects 112A and 112D remain valid, but data object 112B is determined to be invalid based on Rule 8.

Query server 140 then ranks the valid data objects 112 and produces ranking 159. Query server 140 may rank data objects 112 according to any suitable criteria. In the example of FIG. 7F, query server 140 ranks data object 112D higher than data object 112A. Query server 140 then responds to query 136 with response 160. Because data object 112D ranked higher than data object 112A, response 160 includes data object 112D. As a result, data object 112D is returned as the response to query 136. Because query server 140 evaluated conditions, query server 140 can respond to query 136 faster than if query server 140 had evaluated each rule individually against data objects 112.

In addition, techniques, systems, subsystems, and methods described and illustrated in the various embodiments as discrete or separate may be combined or integrated with other systems, modules, techniques, or methods without departing from the scope of the present disclosure. Other items shown or described as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

The invention claimed is:

1. A method, comprising:
    obtaining, from a data hosting server, first, second, third, and fourth data objects stored on the data hosting server;
    binding to the first data object a first plurality of rules that govern the applicability of the first data object;
    binding to the second data object a second plurality of rules that govern the applicability of the second data object;
    binding to the third data object a third plurality of rules that govern the applicability of the third data object;
    binding to the fourth data object a fourth plurality of rules that govern the applicability of the fourth data object;
    determining a first set of conditions under which the first data object is invalid, wherein the first set of conditions is a logical union of at least (1) a set of conditions under which the first data object is invalid according to a first rule of the first plurality of rules and (2) a set of conditions under which the first data object is invalid according to a second rule of the first plurality of rules;
    determining a second set of conditions under which the second data object is invalid, wherein the second set of conditions is a logical union of at least (1) a set of conditions under which the second data object is invalid according to a first rule of the second plurality of rules and (2) a set of conditions under which the second data object is invalid according to a second rule of the second plurality of rules;
    determining a third set of conditions under which the third data object is invalid, wherein the third set of conditions is a logical union of at least (1) a set of conditions under which the third data object is invalid according to a first rule of the third plurality of rules and (2) a set of conditions under which the third data object is invalid according to a second rule of the third plurality of rules;
    determining a fourth set of conditions under which the fourth data object is invalid, wherein the fourth set of conditions is a logical union of at least (1) a set of conditions under which the fourth data object is invalid according to a first rule of the fourth plurality of rules and (2) a set of conditions under which the fourth data object is invalid according to a second rule of the fourth plurality of rules;
    after determining the first, second, third, and fourth sets of conditions, receiving, from a user, a query comprising search criterion; and
    in response to receiving the query:
        determining that the first data object, the third data object, and the fourth data object are eligible for the query by determining that the search criteria does not satisfy the first, third, and fourth set of conditions;
        invalidating the second data object by determining that the search criteria satisfies at least one condition of the second set of conditions;
        after determining that the first data object is eligible for responding to the query, determining that the first data object is valid by applying each rule from the first plurality of rules that was not used to determine the first set of conditions;
        after determining that the fourth data object is eligible for responding to the query, determining that the fourth data object is valid by applying each rule from the fourth plurality of rules that was not used to determine the fourth set of conditions;
        after determining that the third data object is eligible for responding to the query, invalidating the third data object in response to determining that a condition under which the third data object is invalid according to a rule from the third plurality of rules that was not used to determine the third set of conditions is satisfied;
        in response to determining that the first data object and the fourth data object are valid for responding to the query, determining, that the first data object has a higher ranking than the fourth data object; and
        in response to determining that the first data object has a higher ranking, presenting, on a user terminal, the first data object in response to the query.

2. The method of claim 1, wherein determining the fourth set of conditions comprises:
    if an existing set of conditions has already been determined based on the first rule and the second rule of the fourth plurality of rules, determining the fourth set of conditions to be the same as the existing set of conditions.

3. A method, comprising:
    obtaining first, second, third, and fourth fares for a flight between a first location and a second location;
    binding to the first fare a first plurality of rules that govern the applicability of the first fare;
    binding to the second fare a second plurality of rules that govern the applicability of the second fare;
    binding to the third fare a third plurality of rules that govern the applicability of the third fare;
    binding to the fourth fare a fourth plurality of rules that govern the applicability of the fourth fare;
    determining a first set of dates on which the first fare is invalid, the first set of dates is a logical union of at least (1) a set of dates on which the first fare is invalid according to a first rule of the first plurality of rules and (2) a set of dates on which the first fare is invalid according to a second rule of the first plurality of rules;
    determining a second set of dates on which the second fare is invalid, the second set of dates is a logical union of at least (1) a set of dates on which the second fare is invalid according to a first rule of the second plurality of rules and (2) a set of dates on which the second fare is invalid according to a second rule of the second plurality of rules;

determining a third set of dates on which the third fare is invalid, the third set of dates is a logical union of at least (1) a set of dates on which the third fare is invalid according to a first rule of the third plurality of rules and (2) a set of dates on which the third fare is invalid according to a second rule of the third plurality of rules;

determining a fourth set of dates on which the fourth fare is invalid, the fourth set of dates is a logical union of at least (1) a set of dates on which the fourth fare is invalid according to a first rule of the fourth plurality of rules and (2) a set of dates on which the fourth fare is invalid according to a second rule of the fourth plurality of rules;

after determining the first, second, third, and fourth sets of dates, receiving, from a user, a query for flights comprising search criteria comprising an origin location, a destination location, and a departure date; and in response to receiving the query:
  determining that the first fare, the third fare, and the fourth fare are eligible for responding to the query by determining that the departure date is outside the corresponding first, third, and fourth set of dates;
  invalidating the second fare by determining that the departure date is within the second set of dates;
  after determining that the first fare is eligible for responding to the query, determining that the first fare is valid by applying each rule from the first plurality of rules that was not used to determine the first set of dates;
  after determining that the fourth fare is eligible for responding to the query, determining that the fourth fare is valid by applying each rule from the fourth plurality of rules that was not used to determine the fourth set of dates;
  after determining that the third fare is eligible for responding to the query, invalidating the third fare by applying a rule from the third plurality of rules that was not used to determine the third set of dates;
  in response to determining that the first fare and the fourth fare are valid for responding to the query, determining that the first fare is lower than the fourth fare; and
  in response to determining that the first fare is lower than the fourth fare, presenting the first fare in response to the query.

4. The method of claim 3, further comprising:
receiving a request to book the first fare; and
communicating with a booking system to cause the booking of the first fare for a flight between the first location and the second location.

5. The method of claim 3, further comprising:
determining, based on a third rule of the first plurality of rules, a first minimum trip length value for the departure date;
determining, based on a fourth rule of the first plurality of rules, a second minimum trip length value for the departure date; and
determining a combined minimum trip length value for the departure date as the largest of the first minimum trip length value and the second minimum trip length value.

6. The method of claim 5, wherein the first fare is eligible on the departure date if the combined minimum trip length value is less than or equal to the number of days from the departure date through a return date indicated in the query.

7. The method of claim 3, further comprising:
calculating a surcharge value for the first fare based on one or more rules of the plurality of rules bound to the first fare that indicate the application of a surcharge; and
calculating a surcharge value for the fourth fare based on one or more rules of the plurality of rules bound to the fourth fare that indicate the application of a surcharge.

8. The method of claim 7, further comprising:
determining that the first fare has a lower base price than the base price of the fourth fare;
obtaining a full price for the first fare by adding the surcharge value for the first fare to the base price of the first fare;
if the full price of the first fare is less than the base price of the fourth fare, determining that the first fare is the lower of the prices of the first fare and the fourth fare; and
if the full price of the first fare is greater than or equal to the base price of the fourth fare:
  obtaining a full price for the fourth fare by adding the surcharge value of the fourth fare to the base price of the fourth fare; and
  determining the price of the first fare is the lower of the prices of the first fare and the fourth fare if the full price of the fourth fare is greater than or equal to the full price of the fourth fare.

9. The method of claim 3, wherein determining a fourth set of dates on which the fourth fare is invalid comprises:
if an existing set of dates has already been determined based on the first rule and the second rule of the fourth plurality of rules, determining the fourth set of dates to be the same as the existing set of dates.

10. The method of claim 3, wherein determining a fourth set of dates on which the fourth fare is invalid comprises:
if no existing set of dates has already been determined based on the first rule and the second rule of the fourth plurality of rules, determining the set of dates on which the fourth fare is invalid by:
  applying the first rule of the fourth plurality of rules to a range of possible dates as contemplated departure dates; and
  applying the second rule of the fourth plurality of rules to the range of possible dates as contemplated departure dates.

11. The method of claim 3, wherein:
each of the first rule and the second rule of the first plurality of rules comprises a date restriction that prevents the booking of the first fare on one or more dates in a range of dates, irrespective of the time of day of the departure; and
determining the first set of dates on which the first fare is invalid comprises constructing a bit map, wherein the bit map includes a bit value for each day in the range of dates, the bit value being a first value if the day is in the first set of dates and being a second value if the day is not in the first set of dates.

12. The method of claim 3, wherein a rule from the first plurality of rules is not used to determine the first set of dates unless the rule can be completely validated based only on the departure date.

13. A system comprising:
a data hosting server configured to store first, second, third, and fourth fares for a flight between a first location and a second location;

a search space organizing tool communicatively coupled to the data hosting server, the search space organizing tool configured to:
bind to the first fare a first plurality of rules that govern the applicability of the first fare;
bind to the second fare a second plurality of rules that govern the applicability of the second fare;
bind to the third fare a third plurality of rules that govern the applicability of the third fare;
bind to the fourth fare a fourth plurality of rules that govern the applicability of the fourth fare;
determine a first set of dates on which the first fare is invalid, the first set of dates is a logical union of at least (1) a set of dates on which the first fare is invalid according to a first rule of the first plurality of rules and (2) a set of dates on which the first fare is invalid according to a second rule of the first plurality of rules;
determine a second set of dates on which the second fare is invalid, the second set of dates is a logical union of at least (1) a set of dates on which the second fare is invalid according to a first rule of the second plurality of rules and (2) a set of dates on which the second fare is invalid according to a second rule of the second plurality of rules;
determine a third set of dates on which the third fare is invalid, the third set of dates is a logical union of at least (1) a set of dates on which the third fare is invalid according to a first rule of the third plurality of rules and (2) a set of dates on which the third fare is invalid according to a second rule of the third plurality of rules; and
determine a fourth set of dates on which the fourth fare is invalid, the fourth set of dates is a logical union of at least (1) a set of dates on which the fourth fare is invalid according to a first rule of the fourth plurality of rules and (2) a set of dates on which the fourth fare is invalid according to a second rule of the fourth plurality of rules; and
a query server configured to:
after the search space organizing tool has determined the first, second, third, and fourth sets of dates, receive, from a user, a query for flights comprising search criteria comprising an origin location, a destination location, and a departure date; and
in response to receiving the query:
determine that the first fare, the third fare, and the fourth fare are eligible for responding to the query by determining that the departure date is outside the first, third, and fourth set of dates;
invalidate the second fare by determining that the departure date is within the second set of dates;
after determining that the first fare is eligible for responding to the query, determine that the first fare is valid by applying each rule from the first plurality of rules that was not used to determine the first set of dates;
after determining that the fourth fare is eligible for responding to the query, determine that the fourth fare is valid by applying each rule from the fourth plurality of rules that was not used to determine the fourth set of dates;
after determining that the third fare is eligible for responding to the query, invalidate the third fare by applying a rule from the third plurality of rules that was not used to determine the third set of dates;
in response to determining that the first fare and the fourth fare are valid for the query, determine that the first fare is lower than the fourth fare; and
in response to determining that the first fare is lower than the fourth fare, present the first fare in response to the query.

14. The system of claim 13, wherein the search space organizing tool is further configured to:
determine, based on a third rule of the first plurality of rules, a first minimum trip length value for the departure date;
determine, based on a fourth rule of the first plurality of rules, a second minimum trip length value for the departure date; and
determine a combined minimum trip length value for the departure date as the largest of the first minimum trip length value and the second minimum trip length value.

15. The system of claim 14, wherein the first fare is eligible on the departure date if the combined minimum trip length value is less than or equal to the number of days from the departure date through a return date indicated in the query.

16. The system of claim 13, wherein the query server is further configured to:
calculate a surcharge value for the first fare based on one or more rules of the plurality of rules bound to the first fare that indicate the application of a surcharge; and
calculate a surcharge value for the fourth fare based on one or more rules of the plurality of rules bound to the fourth fare that indicate the application of a surcharge.

17. The system of claim 16, wherein the query server is further configured to:
determine that the first fare has a lower base price than the base price of the fourth fare;
obtain a full price for the first fare by adding the surcharge value for the first fare to the base price of the first fare;
if the full price of the first fare is less than the base price of the fourth fare, determine that the first fare is the lower of the prices of the first fare and the fourth fare; and
if the full price of the first fare is greater than or equal to the base price of the fourth fare:
obtain a full price for the fourth fare by adding the surcharge value of the fourth fare to the base price of the fourth fare; and
determine the price of the first fare is the lower of the prices of the first fare and the fourth fare if the full price of the fourth fare is greater than or equal to the full price of the fourth fare.

18. The system of claim 13, wherein determining a fourth set of dates on which the fourth fare is invalid comprises:
if an existing set of dates has already been determined based on the first rule and the second rule of the fourth plurality of rules, determining the fourth set of dates to be the same as the existing set of dates.

19. The system of claim 13, wherein determining a fourth set of dates on which the fourth fare is invalid comprises:
if no existing set of dates has already been determined based on the first rule and the second rule of the fourth plurality of rules, determining the set of dates on which the fourth fare is invalid by:
applying the first rule of the fourth plurality of rules to a range of possible dates as contemplated departure dates; and
applying the second rule of the fourth plurality of rules to the range of possible dates as contemplated departure dates.

20. The system of claim 13, wherein:

each of the first rule and the second rule of the first plurality of rules comprises a date restriction that prevents the booking of the first fare on one or more dates in a range of dates, irrespective of the time of day of the departure; and determining the first set of dates on which the first fare is invalid comprises constructing a bit map, wherein the bit map includes a bit value for each day in the range of dates, the bit value being a first value if the day is in the first set of dates and being a second value if the day is not in the first set of dates.

* * * * *